US009172930B2

(12) United States Patent
Tokumura

(10) Patent No.: US 9,172,930 B2
(45) Date of Patent: Oct. 27, 2015

(54) ELECTRONIC APPARATUS, ELECTRONIC APPARATUS CONTROL DEVICE, METHOD OF DRIVING ELECTRONIC APPARATUS, AND METHOD OF DRIVING ELECTRO-OPTIC DEVICE

(71) Applicant: SEIKO EPSON CORPORATION, Tokyo (JP)

(72) Inventor: Toshiaki Tokumura, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 5 days.

(21) Appl. No.: 14/043,080

(22) Filed: Oct. 1, 2013

(65) Prior Publication Data

US 2014/0104329 A1  Apr. 17, 2014

(30) Foreign Application Priority Data

Oct. 17, 2012  (JP) ................. 2012-229587

(51) Int. Cl.
| | |
|---|---|
| *H04N 9/31* | (2006.01) |
| *G02F 1/13* | (2006.01) |
| *G09G 3/00* | (2006.01) |
| *G09G 3/36* | (2006.01) |

(52) U.S. Cl.
CPC ............. *H04N 9/3179* (2013.01); *G02F 1/13* (2013.01); *G09G 3/002* (2013.01); *H04N 9/312* (2013.01); *G09G 3/003* (2013.01); *G09G 3/3666* (2013.01); *G09G 2310/0221* (2013.01); *G09G 2310/08* (2013.01); *G09G 2340/0464* (2013.01); *G09G 2340/10* (2013.01)

(58) Field of Classification Search
CPC ........ H04N 9/3179; H04N 9/312; G02F 1/13; G09G 3/002; G09G 3/003; G09G 3/3666; G09G 2310/0221; G09G 2310/08; G09G 2340/0464; G09G 2340/10
USPC ................... 345/94–103, 690–694, 208–213; 348/792–793
See application file for complete search history.

(56) References Cited

U.S. PATENT DOCUMENTS

| | | | |
|---|---|---|---|
| 6,831,633 B1 | 12/2004 | Murade | |
| 6,989,824 B1* | 1/2006 | Ishii et al. | ..................... 345/204 |
| 7,161,576 B2* | 1/2007 | Kawabe et al. | .................. 345/99 |
| 7,626,567 B2* | 12/2009 | Aoki | ................................. 345/87 |
| 8,502,810 B2 | 8/2013 | Yoshinaga et al. | |
| 2006/0152464 A1* | 7/2006 | Ishii | ............................... 345/98 |

(Continued)

FOREIGN PATENT DOCUMENTS

| | | |
|---|---|---|
| JP | 08-102901 A | 4/1996 |
| JP | 2003-099019 A | 4/2003 |

(Continued)

*Primary Examiner* — Lun-Yi Lao
*Assistant Examiner* — Elliott Deaderick
(74) *Attorney, Agent, or Firm* — Maschoff Brennan

(57) ABSTRACT

An electronic apparatus includes first and second panels. A scanning line driving circuit is formed in each of the first and second panels. The scanning line driving circuit can perform a scanning to select k scanning lines for every k lines from m scanning lines. A first start pulse signal supplied to the first panel and a second start pulse signal supplied to the second panel can be temporarily shifted only an integer multiple of half of a horizontal scanning period of the scanning. Thus, even when a high-definition image is displayed at a high speed using the scanning, the position of a display image can be minutely adjusted, and thus a high-quality image can be displayed.

7 Claims, 22 Drawing Sheets

(56) References Cited

U.S. PATENT DOCUMENTS

| | | | |
|---|---|---|---|
| 2010/0013802 A1* | 1/2010 | Hosaka et al. | 345/204 |
| 2010/0295837 A1 | 11/2010 | Yoshinaga et al. | |
| 2011/0018859 A1* | 1/2011 | Ito | 345/213 |
| 2012/0038692 A1* | 2/2012 | Ito | 345/691 |
| 2012/0050353 A1 | 3/2012 | Ito | |

FOREIGN PATENT DOCUMENTS

| | | |
|---|---|---|
| JP | 2010-271366 A | 12/2010 |
| JP | 2012-049645 A | 3/2012 |

* cited by examiner

FIG.7B

| ROW NUMBER | IMAGE SIGNAL |
|---|---|
| G1 | Black |
| G2 | Black |
| G3 | Black |
| G4 | Black |
| G5 | V1j |
| G6 | V1j |
| G7 | V3j |
| G8 | V3j |
| G9 | V5j |
| G10 | V5j |
| ⋮ | ⋮ |
| Gm-5(G1083) | Vm-9j(V1079j) |
| Gm-4(G1084) | Vm-9j(V1079j) |
| Gm-3(G1085) | Black |
| Gm-2(G1086) | Black |
| Gm-1(G1087) | Black |
| Gm(G1088) | Black |

FIG.7C

| ROW NUMBER | IMAGE SIGNAL |
|---|---|
| G1 | Black |
| G2 | Black |
| G3 | Black |
| G4 | Black |
| G5 | V2j |
| G6 | V2j |
| G7 | V4j |
| G8 | V4j |
| G9 | V6j |
| G10 | V6j |
| ⋮ | ⋮ |
| Gm-5(G1083) | Vm-8j(V1080j) |
| Gm-4(G1084) | Vm-8j(V1080j) |
| Gm-3(G1085) | Black |
| Gm-2(G1086) | Black |
| Gm-1(G1087) | Black |
| Gm(G1088) | Black |

FIG.8B

| ROW NUMBER | IMAGE SIGNAL |
|---|---|
| G1 | Black |
| G2 | Black |
| G3 | Black |
| G4 | Black |
| G5 | Black |
| G6 | V1j |
| G7 | V1j |
| G8 | V3j |
| G9 | V3j |
| G10 | V5j |
| ⋮ | ⋮ |
| Gm-5(G1083) | Vm-7j(V1077j) |
| Gm-4(G1084) | Vm-9j(V1079j) |
| Gm-3(G1085) | Vm-9j(V1079j) |
| Gm-2(G1086) | Black |
| Gm-1(G1087) | Black |
| Gm(G1088) | Black |

FIG.8C

| ROW NUMBER | IMAGE SIGNAL |
|---|---|
| G1 | Black |
| G2 | Black |
| G3 | Black |
| G4 | Black |
| G5 | Black |
| G6 | V2j |
| G7 | V2j |
| G8 | V4j |
| G9 | V4j |
| G10 | V6j |
| ⋮ | ⋮ |
| Gm-5(G1083) | Vm-6j(V1078j) |
| Gm-4(G1084) | Vm-8j(V1080j) |
| Gm-3(G1085) | Vm-8j(V1080j) |
| Gm-2(G1086) | Black |
| Gm-1(G1087) | Black |
| Gm(G1088) | Black |

FIG.9B

| ROW NUMBER | IMAGE SIGNAL |
|---|---|
| G1 | Black |
| G2 | Black |
| G3 | Black |
| G4 | Black |
| G5 | V1j |
| G6 | V1j |
| G7 | V3j |
| G8 | V3j |
| G9 | V5j |
| G10 | V5j |
| ⋮ | ⋮ |
| Gm-5(G1083) | Vm-9j(V1079j) |
| Gm-4(G1084) | Vm-9j(V1079j) |
| Gm-3(G1085) | Black |
| Gm-2(G1086) | Black |
| Gm-1(G1087) | Black |
| Gm(G1088) | Black |

FIG.9C

| ROW NUMBER | IMAGE SIGNAL |
|---|---|
| G1 | Black |
| G2 | Black |
| G3 | Black |
| G4 | Black |
| G5 | Black |
| G6 | V2j |
| G7 | V2j |
| G8 | V4j |
| G9 | V4j |
| G10 | V6j |
| ⋮ | ⋮ |
| Gm-5(G1083) | Vm-6j(V1078j) |
| Gm-4(G1084) | Vm-8j(V1080j) |
| Gm-3(G1085) | Vm-8j(V1080j) |
| Gm-2(G1086) | Black |
| Gm-1(G1087) | Black |
| Gm(G1088) | Black |

FIG.10B

| ROW NUMBER | IMAGE SIGNAL |
|---|---|
| G1 | Black |
| G2 | Black |
| G3 | Black |
| G4 | Black |
| G5 | Black |
| G6 | V1j |
| G7 | V1j |
| G8 | V3j |
| G9 | V3j |
| G10 | V5j |
| ⋮ | ⋮ |
| Gm-5(G1083) | Vm-7j(V1077j) |
| Gm-4(G1084) | Vm-9j(V1079j) |
| Gm-3(G1085) | Vm-9j(V1079j) |
| Gm-2(G1086) | Black |
| Gm-1(G1087) | Black |
| Gm(G1088) | Black |

FIG.10C

| ROW NUMBER | IMAGE SIGNAL |
|---|---|
| G1 | Black |
| G2 | Black |
| G3 | Black |
| G4 | Black |
| G5 | Black |
| G6 | Black |
| G7 | V2j |
| G8 | V2j |
| G9 | V4j |
| G10 | V4j |
| ⋮ | ⋮ |
| Gm-5(G1083) | Vm-6j(V1078j) |
| Gm-4(G1084) | Vm-6j(V1078j) |
| Gm-3(G1085) | Vm-8j(V1080j) |
| Gm-2(G1086) | Vm-8j(V1080j) |
| Gm-1(G1087) | Black |
| Gm(G1088) | Black |

FIG.13B

| ROW NUMBER | IMAGE SIGNAL |
|---|---|
| G1 | Black |
| G2 | Black |
| G3 | Black |
| G4 | Black |
| G5 | V1j |
| G6 | V1j |
| G7 | V3j |
| G8 | V3j |
| G9 | V5j |
| G10 | V5j |
| ⋮ | ⋮ |
| Gm-5(G1083) | Vm-9j(V1079j) |
| Gm-4(G1084) | Vm-9j(V1079j) |
| Gm-3(G1085) | Black |
| Gm-2(G1086) | Black |
| Gm-1(G1087) | Black |
| Gm(G1088) | Black |

FIG.13C

| ROW NUMBER | IMAGE SIGNAL |
|---|---|
| G1 | – |
| G2 | Black |
| G3 | – |
| G4 | Black |
| G5 | – |
| G6 | V2j |
| G7 | – |
| G8 | V4j |
| G9 | – |
| G10 | V6j |
| ⋮ | ⋮ |
| Gm-5(G1083) | – |
| Gm-4(G1084) | Vm-8j(V1080j) |
| Gm-3(G1085) | – |
| Gm-2(G1086) | Black |
| Gm-1(G1087) | – |
| Gm(G1088) | Black |

FIG.14B

| ROW NUMBER | IMAGE SIGNAL |
|---|---|
| G1 | Black |
| G2 | Black |
| G3 | Black |
| G4 | Black |
| G5 | Black |
| G6 | V1j |
| G7 | V1j |
| G8 | V3j |
| G9 | V3j |
| G10 | V5j |
| ⋮ | ⋮ |
| Gm-5(G1083) | Vm-7j(V1077j) |
| Gm-4(G1084) | Vm-9j(V1079j) |
| Gm-3(G1085) | Vm-9j(V1079j) |
| Gm-2(G1086) | Black |
| Gm-1(G1087) | Black |
| Gm(G1088) | Black |

FIG.14C

| ROW NUMBER | IMAGE SIGNAL |
|---|---|
| G1 | Black |
| G2 | – |
| G3 | Black |
| G4 | – |
| G5 | Black |
| G6 | – |
| G7 | V2j |
| G8 | – |
| G9 | V4j |
| G10 | – |
| ⋮ | ⋮ |
| Gm-5(G1083) | Vm-6j(V1078j) |
| Gm-4(G1084) | – |
| Gm-3(G1085) | Vm-8j(V1080j) |
| Gm-2(G1086) | – |
| Gm-1(G1087) | Black |
| Gm(G1088) | – |

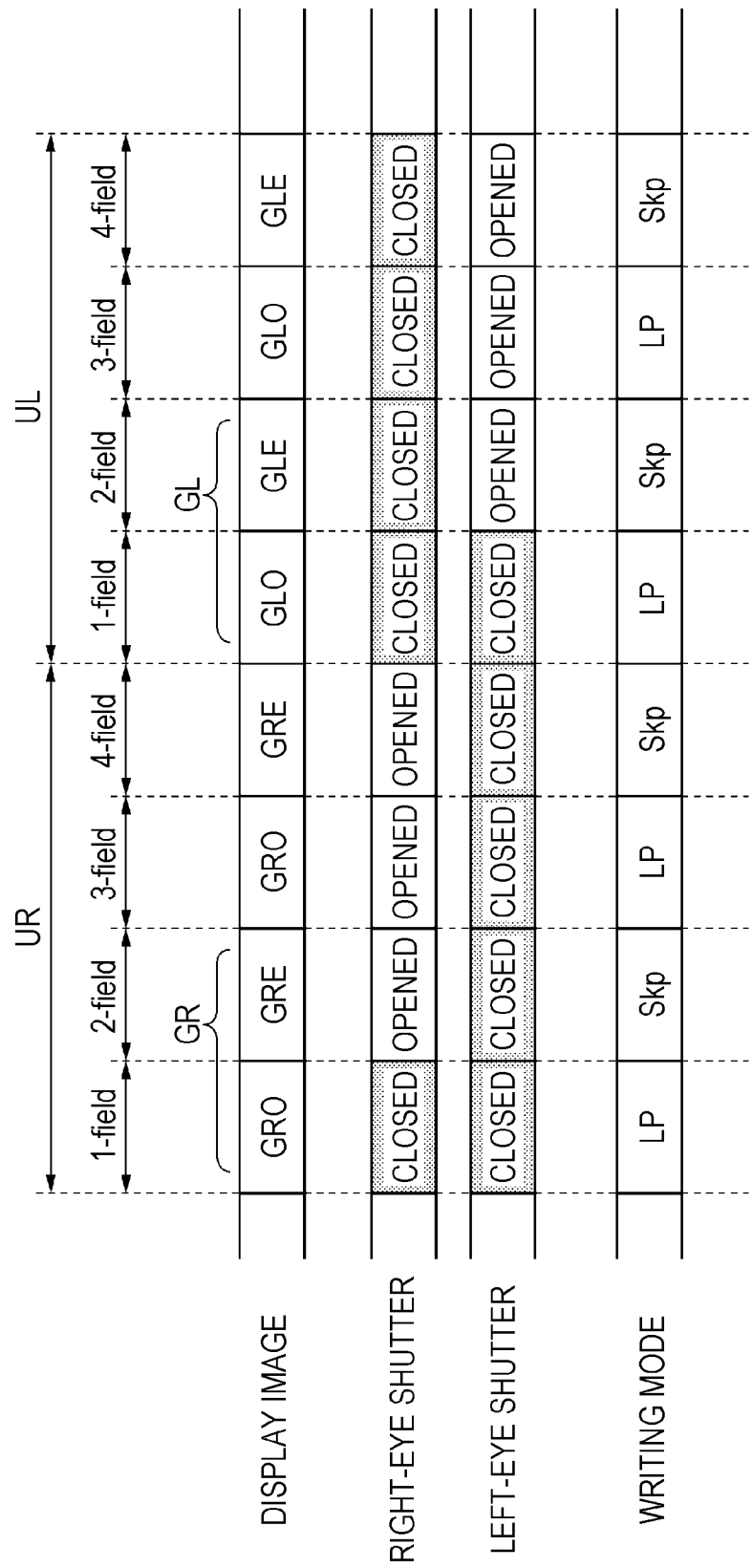

ELECTRONIC APPARATUS, ELECTRONIC APPARATUS CONTROL DEVICE, METHOD OF DRIVING ELECTRONIC APPARATUS, AND METHOD OF DRIVING ELECTRO-OPTIC DEVICE

BACKGROUND

1. Technical Field

The present invention relates to an electronic apparatus, an electronic apparatus control device, a method of driving the electronic apparatus, and a method of driving an electro-optic device.

2. Related Art

A projector is an electronic apparatus that radiates light to a projection type electro-optic device or a reflection type electro-optic device and projects transmitted light or reflected light modulated by such an electro-optic device onto a screen. The projector has the advantage of displaying a large screen since the projector is configured such that light arriving from a light source is condensed and caused to be incident by the electro-optic device and transmitted light or reflected light modulated according to an electric signal is expanded and projected to the screen through a projection lens. A liquid crystal device is known as an electro-optic device used in such an electronic apparatus. The liquid crystal device forms an image using dielectric anisotropy of liquid crystal and optical activity of light in a liquid crystal layer. To display a color image, a red image, a green image, and a blue image are projected in an overlapping manner to a screen using three liquid crystal devices, that is, a red liquid crystal device, a green liquid crystal device, and a blue liquid crystal device.

The positions of the three images have to be identical on the screen. An example of a technology for adjusting the positions of images is disclosed in JP-A-8-102901. The technology of JP-A-8-102901 is known as electric alignment and is a technology for adjusting positions at which images are displayed within an effective screen by changing signals supplied to the liquid crystal devices.

On the other hand, in the liquid crystal devices, there are a case in which scanning lines are selected one by one and a case in which the scanning lines are selected two by two, as disclosed in JP-A-2012-49645, according to the display method.

When the electric alignment method disclosed in JP-A-8-102901 is applied to the liquid crystal device that utilizes the display method of selecting the scanning lines two by two, as disclosed in JP-A-2012-49645, the positions of the displayed images are misaligned normally by an integer multiple corresponding to two scanning lines, and thus minute adjustment of changing the positions of the displayed images in units of one scanning line may not be achieved. In other words, in the electro-optic devices of the related art, there is a problem that it is difficult to realize high-quality image display according to circumstances.

SUMMARY

The invention can be realized in the following forms or application examples.

APPLICATION EXAMPLE 1

According to this application example, there is provided an electronic apparatus including: a first electro-optic device that includes a first display region; a second electro-optic device that includes a second display region; a control device that controls a display position of a first image displayed in the first display region and a display position of a second image displayed in the second display region; and a combining device that combines the first and second images. The first electro-optic device includes $m_1$ scanning lines (where $m_1$ is an integer equal to or greater than 3) that are disposed in the first display region, and a first scanning line driving circuit that performs a line group scanning (a scanning) to sequentially select the $m_1$ scanning lines k by k (where k is an integer equal to or greater than 2). The second electro-optic device includes $m_2$ scanning lines (where $m_2$ is an integer equal to or greater than 3) that are disposed in the second display region, and a second scanning line driving circuit that performs the line group scanning to sequentially select the $m_2$ scanning lines k by k. The control device includes a supply unit that supplies a first start pulse signal, a first clock signal used to shift the first start pulse signal, and a first enable signal logically combined with a signal shifted using the first clock signal to the first scanning line driving circuit and supplies a second start pulse signal, a second clock signal used to shift the second start pulse signal, and a second enable signal logically combined with a signal shifted using the second clock signal to the second scanning line driving circuit, and a control unit that shifts a phase of the second start pulse signal by half of one horizontal scanning period of the line group scanning, shifts a phase of the second clock signal by the half of the horizontal scanning period of the line group scanning, and shifts a phase of the second enable signal by one horizontal scanning period of the ling group scanning, when the display position of the second image is shifted by one scanning line.

In the line group scanning, a high-definition image can be displayed at a high speed. In this configuration, even when the line group scanning in which the first and second electro-optic devices simultaneously select a plurality of scanning lines is performed, the position of the image formed by the first electro-optic device and the position of the image formed by the second electro-optic device can be changed in units of one scanning line. In other words, even when a high-definition image is displayed at a high speed using the line group scanning, the position of a display image can be minutely adjusted, and thus the high-quality image can be displayed.

APPLICATION EXAMPLE 2

In the electronic apparatus according to the above-described application example, the control device may further include a storage circuit that stores at least a set value. The control unit may control the phase according to the set value.

In this configuration, the position of the image formed by the second electro-optic device relative to the position of the image formed by the first electro-optic device can be stored as the set value.

APPLICATION EXAMPLE 3

In the electronic apparatus according to the above-described application example, the first start pulse signal, the first clock signal, the first enable signal, the second start pulse signal, the second clock signal, and the second enable signal may have a plurality of output patterns. The control device may supply a control signal with an optimum output pattern from the plurality of output patterns according to the set value.

In this configuration, the output pattern in which the position of the image formed by the first electro-optic device is the closest to the position of the image formed by the second electro-optic device can be supplied.

APPLICATION EXAMPLE 4

According to this application example, there is provided a control device used in an electronic apparatus including a first electro-optic device that includes a first display region, a second electro-optic device that includes a second display region, and a combining device that combines a first image displayed in the first display region and a second image displayed in the second display region. The first electro-optic device includes $m_1$ scanning lines (where $m_1$ is an integer equal to or greater than 3) that are disposed in the first display region, and a first scanning line driving circuit that performs the line group scanning to sequentially select the $m_1$ scanning lines k by k (where k is an integer equal to or greater than 2). The second electro-optic device includes $m_2$ scanning lines (where $m_2$ is an integer equal to or greater than 3) that are disposed in the second display region, and a second scanning line driving circuit that performs the line group scanning to sequentially select the $m_2$ scanning lines k by k. The control device controls a display position of the first image and a display position of the second image. The control device includes a supply unit that supplies a first start pulse signal, a first clock signal used to shift the first start pulse signal, and a first enable signal logically combined with a signal shifted using the first clock signal to the first scanning line driving circuit and supplies a second start pulse signal, a second clock signal used to shift the second start pulse signal, and a second enable signal logically combined with a signal shifted using the second clock signal to the second scanning line driving circuit, and a control unit that shifts a phase of the second start pulse signal by half of one horizontal scanning period of the line group scanning, shifts a phase of the second clock signal by the half of the horizontal scanning period of the line group scanning, and shifts a phase of the second enable signal by one horizontal scanning period of the ling group scanning, when the display position of the second image is shifted by one scanning line.

In the line group scanning, a high-definition image can be displayed at a high speed. In this configuration, even when the line group scanning in which the first and second electro-optic devices simultaneously select a plurality of scanning lines is performed, the position of the image formed by the first electro-optic device and the position of the image formed by the second electro-optic device can be changed in units of one scanning line. In other words, even when a high-definition image is displayed at a high speed using the line group scanning, the position of a display image can be minutely adjusted, and thus the high-quality image can be displayed.

APPLICATION EXAMPLE 5

According to this application example, there is provided a method of driving an electronic apparatus including a first electro-optic device that includes a first display region, a second electro-optic device that includes a second display region, a control device that controls a display position of a first image displayed in the first display region and a display position of a second image displayed in the second display region, and a combining device that combines the first and second images. The first electro-optic device includes $m_1$ scanning lines (where $m_1$ is an integer equal to or greater than 3) that are disposed in the first display region, and a first scanning line driving circuit that performs the line group scanning to sequentially select the $m_1$ scanning lines k by k (where k is an integer equal to or greater than 2). The second electro-optic device includes $m_2$ scanning lines (where $m_2$ is an integer equal to or greater than 3) that are disposed in the second display region, and a second scanning line driving circuit that performs the line group scanning to sequentially select the $m_2$ scanning lines k by k. The method includes: supplying a first start pulse signal, a first clock signal used to shift the first start pulse signal, and a first enable signal logically combined with a signal shifted using the first clock signal to the first scanning line driving circuit; supplying a second start pulse signal, a second clock signal used to shift the second start pulse signal, and a second enable signal logically combined with a signal shifted using the second clock signal to the second scanning line driving circuit; shifting a phase of the second start pulse signal by half of one horizontal scanning period of the line group scanning, shifting a phase of the second clock signal by the half of the horizontal scanning period of the line group scanning, and shifting a phase of the second enable signal by one horizontal scanning period of the ling group scanning, when the display position of the second image is shifted by one scanning line.

In the line group scanning, a high-definition image can be displayed at a high speed. In this configuration, even when the line group scanning in which the first and second electro-optic devices simultaneously select a plurality of scanning lines is performed, the position of the image formed by the first electro-optic device and the position of the image formed by the second electro-optic device can be changed in units of one scanning line. In other words, even when a high-definition image is displayed at a high speed using the line group scanning, the position of a display image can be minutely adjusted, and thus the high-quality image can be displayed.

APPLICATION EXAMPLE 6

According to this application example, there is provided an electro-optic device driving method including: supplying control signals to first and second electro-optic devices. The first and second electro-optic devices form one frame image using first and second field images. The first electro-optic device includes a first display region including $m_1$ scanning lines (where $m_1$ is an integer equal to or greater than 3) and a first scanning line driving circuit. The first scanning line driving circuit includes a circuit that performs line pair scanning to select two scanning lines for every two lines from the $m_1$ scanning lines. The second electro-optic device includes a second display region including $m_2$ scanning lines (where $m_2$ is an integer equal to or greater than 3) and a second scanning line driving circuit. The second scanning line driving circuit includes a circuit that performs the line pair scanning to select two scanning lines for every two lines from the $m_2$ scanning lines. The control signals include a first start pulse signal supplied to the first scanning line driving circuit, a first clock signal supplied to the first scanning line driving circuit, a first enable signal supplied to the first scanning line driving circuit, a second start pulse signal supplied to the second scanning line driving circuit, a second clock signal supplied to the second scanning line driving circuit, and a second enable signal supplied to the second scanning line driving circuit. The first and second start pulse signals are temporally shifted only by an integer multiple of half of a horizontal scanning period of the line pair scanning. The first and second clock signals are different from each other in phase at the same period. The first and second enable signals are different from each other. The first and second field images are formed using the line pair scanning. The first field image is an image (odd image) formed using an image signal of an odd row of the frame image or an image (even image) formed using an image signal of an even row of the frame image. The second field image is the even image when the first field image is the odd image, and is the odd image when the first field image is the even image. One scanning line is shifted between the line pair scanning at the time of the formation of the first field image and the line pair scanning at the time of the formation of the second field image.

When the line pair scanning is used to form the first and second field images, a high-definition image can be displayed at a high speed. In this method, even when the line group scanning in which the first and second electro-optic devices simultaneously select two scanning lines is performed, the position of the image formed by the first electro-optic device and the position of the image formed by the second electro-optic device can be changed in units of one scanning line. In other words, even when a high-definition image is displayed at a high speed using the line group scanning, the position of a display image can be minutely adjusted, and thus the high-quality image can be displayed. Further, bright display can be realized when this method is used for three-dimensional display.

APPLICATION EXAMPLE 7

According to this application example, there is provided an electro-optic device driving method including supplying control signals to first and second electro-optic devices. The first and second electro-optic devices form one frame image using first and second field images. The first electro-optic device includes a first display region including $m_1$ scanning lines (where $m_1$ is an integer equal to or greater than 3) and a first scanning line driving circuit. The first scanning line driving circuit includes a circuit that performs line pair scanning to select two scanning lines for every two lines from the $m_1$ scanning lines and performs interlacing scanning to select one scanning line for every two lines from the $m_1$ scanning lines. The second electro-optic device includes a second display region including $m_2$ scanning lines (where $m_2$ is an integer equal to or greater than 3) and a second scanning line driving circuit. The second scanning line driving circuit includes a circuit that performs the line pair scanning to select two scanning lines for every two lines from the $m_2$ scanning lines and performs the interlacing scanning to select one scanning line for every two lines from the $m_2$ scanning lines. The control signals include a first start pulse signal supplied to the first scanning line driving circuit, a first clock signal supplied to the first scanning line driving circuit, a first enable signal supplied to the first scanning line driving circuit, a second start pulse signal supplied to the second scanning line driving circuit, a second clock signal supplied to the second scanning line driving circuit, and a second enable signal supplied to the second scanning line driving circuit. At the time of the line pair scanning, the first and second start pulse signals are temporarily shifted only by an integer multiple of half of a horizontal scanning period of the line pair scanning. At the time of the line pair scanning, the first and second clock signals are different from each other in phase at the same period. At the time of the line pair scanning, the first and second enable signals are different from each other. The first field image is formed using the line pair scanning and the second field image is formed using the interlacing scanning. The first field image is an image (odd image) formed using an image signal of an odd row of the frame image or an image (even image) formed using an image signal of an even row of the frame image. The second field image is the even image when the first field image is the odd image, and the second image is the odd image when the first field image is the even image.

When the line pair scanning is used to form the first field image and the interlacing scanning is used to form the second field image, a high-definition image can be displayed at a high speed. In this method, even when the line group scanning in which the first and second electro-optic devices simultaneously select two scanning lines is performed, the position of the image formed by the first electro-optic device and the position of the image formed by the second electro-optic device can be changed in units of one scanning line. In other words, even when a high-definition image is displayed at a high speed using the line group scanning, the position of a display image can be minutely adjusted, and thus the high-quality image can be displayed. Further, bright display can be realized when this method is used for three-dimensional display.

BRIEF DESCRIPTION OF THE DRAWINGS

The invention will be described with reference to the accompanying drawings, wherein like numbers reference like elements.

FIGS. 7A to 7C are diagrams illustrating control signals and display images supplied to a first electro-optic device.

FIGS. 8A to 8C are diagrams illustrating control signals and display images supplied to a second electro-optic device.

FIGS. 9A to 9C are diagrams illustrating control signals and display images supplied to the first electro-optic device.

FIGS. 10A to 10C are diagrams illustrating control signals and display images supplied to the second electro-optic device.

FIGS. 13A to 13C are diagrams illustrating control signals and display images supplied to a first electro-optic device according to a second embodiment.

FIGS. 14A to 14C are diagrams illustrating control signals and display images supplied to a second electro-optic device according to the second embodiment.

FIG. 15 is a diagram illustrating a method of displaying a three-dimensional image using the electronic apparatus according to the second embodiment.

DESCRIPTION OF EXEMPLARY EMBODIMENTS

Hereinafter, embodiments of the invention will be described with reference to the drawings. Since each layer or each member is displayed with a recognizable size in each of the following drawings, the scale of each layer or each member may differ from an actual scale.

First Embodiment

Overview of Electronic Apparatus

Figure 1:
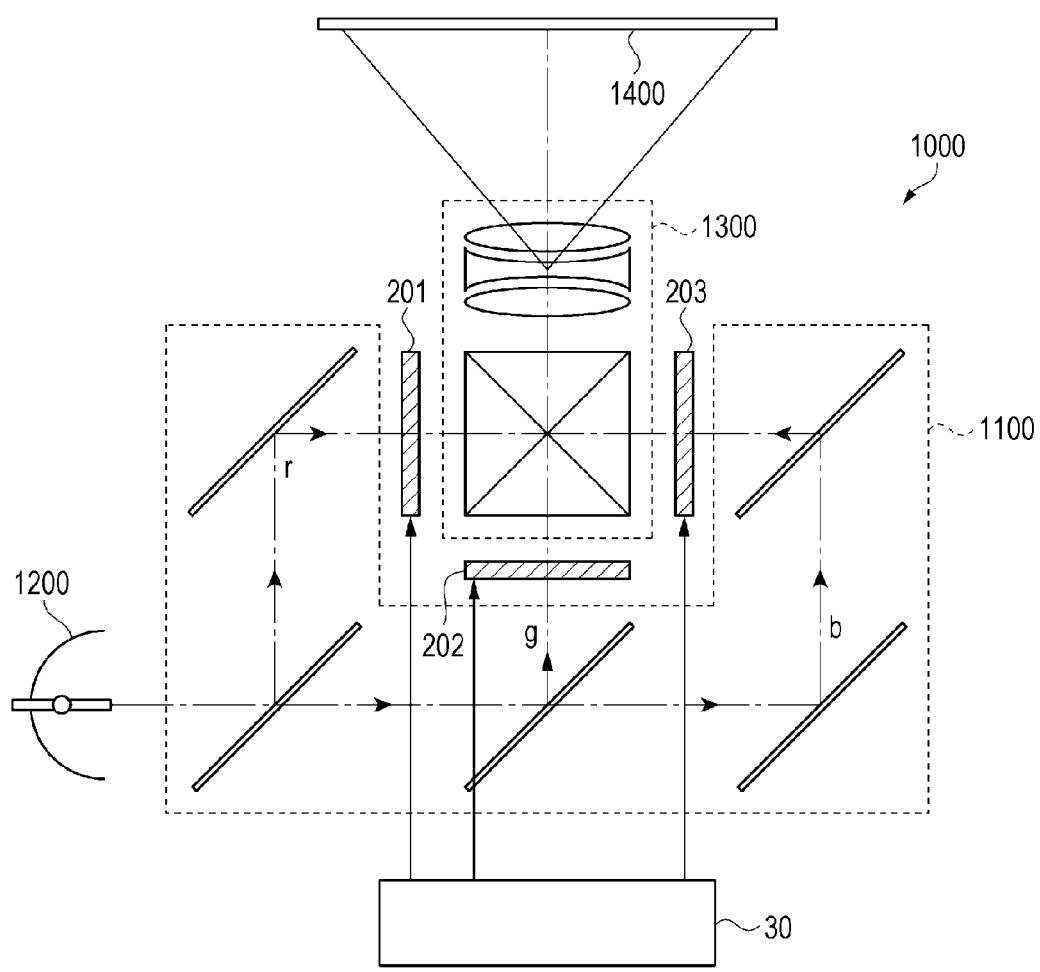
FIG. 1 is a schematic diagram illustrating a projection type display apparatus which is an example of an electronic apparatus.

FIG. 1 is a schematic diagram illustrating a projection-type display apparatus (3-plate type projector) which is an example of an electronic apparatus. Hereinafter, the configuration of an electronic apparatus will be described with reference to FIG. 1.

The electronic apparatus (projection type display apparatus 1000) includes at least a first electro-optic device (hereinafter, abbreviated to a first panel 201), a second electro-optic device (hereinafter, abbreviated to a second panel 202), and a control device 30 that supplies control signals to the first and second electro-optic devices. The electronic apparatus according to this embodiment further includes a third electro-optic device (hereinafter, abbreviated to a third panel 203). The control device 30 also supplies control signals to the third electro-optic device. The first panel 201, the second panel 202, and the third panel 203 are three electro-optic devices 20 (see FIG. 2) corresponding to different display colors (red, green, and blue). Hereinafter, when it is not necessary to distinguish the first panel 201, the second panel 202, and the third panel 203 from each other, the first panel 201, the second panel 202, and the third panel 203 are simply referred to as the electro-optic devices 20 collectively.

An illumination optical system 1100 supplies a red component r, a green component g, and a blue component b in light emitted from an illumination device (light source) 1200 to the first panel 201, the second panel 202, and the third panel 203, respectively. Each electro-optic device 20 functions as an optical modulator (light valve) that modulates each color light supplied from the illumination optical system 1100 according to a display image. A projection optical system 1300 combines light emitted from the respective electro-optic devices 20 and projects the combined light to a projection surface 1400.

Circuit Configuration of Electronic Apparatus

Figure 2:
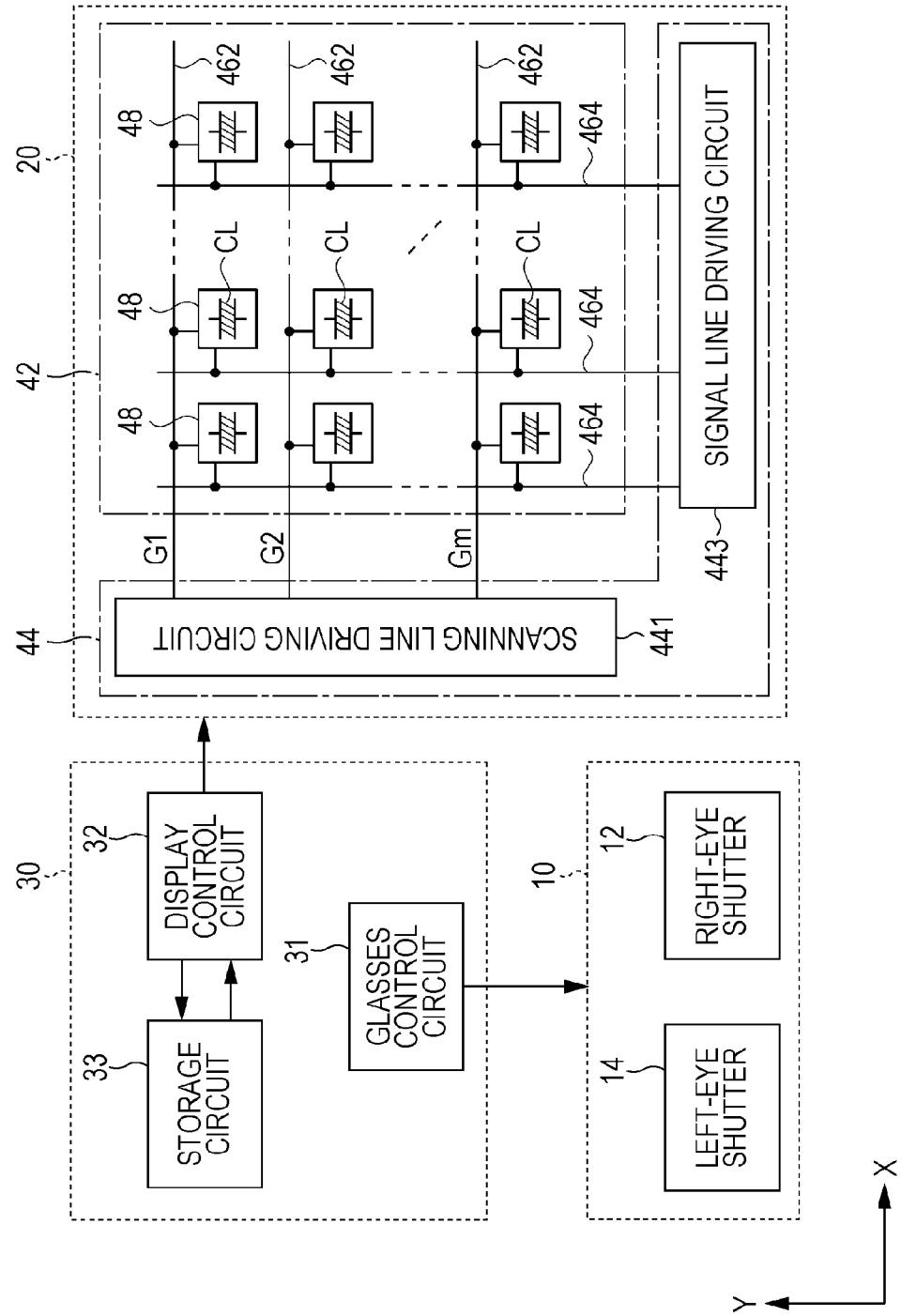
FIG. 2 is a circuit diagram illustrating the configuration of the electronic apparatus.

FIG. 2 is a circuit diagram illustrating the configuration of the electronic apparatus. Next, the circuit configuration of the electronic apparatus will be described with reference to FIG. 2.

The electronic apparatus according to this embodiment can display a stereoscopic image that enables a viewer to perceive a stereoscopic effect according to a frame sequential scheme. As illustrated in FIG. 2, the electronic apparatus includes stereoscopic glasses 10, the electro-optic devices 20, and the control device 30.

The stereoscopic glasses 10 are a glasses-type instrument which a viewer wears when viewing a stereoscopic image displayed by the electro-optic device 20. The stereoscopic glasses 10 include a right-eye shutter 12 located in front of the right eye of the viewer and a left-eye shutter 14 located in front of the left eye of the viewer. Each of the right-eye shutter 12 and the left-eye shutter 14 is controlled to be in an opened state in which radiated light transmits and a closed state in which radiated light is blocked. For example, liquid crystal shutters configured such that one of the opened state and the closed state is changed to the other state according to a liquid crystal alignment direction appropriate for an applied voltage can be used as the right-eye shutter 12 and the left-eye shutter 14.

The electro-optic device 20 includes a display region 42 in which a plurality of pixel circuits 48 are arrayed and a driving circuit 44 that drives each pixel circuit 48. In the display region 42, a plurality of scanning lines 462 and a plurality of signal lines 464 intersecting one another are formed. When an i-th scanning line 462 is specified among the scanning lines 462, the i-th scanning line 462 is referred to as a scanning line Gi. The pixel circuits 48 are arrayed in a matrix form so as to correspond to intersections of the scanning lines 462 and the signal lines 464. In the first electro-optic device (first panel 201), a first display region 421 (see FIGS. 5A to 5C) including $m_1$ scanning lines 462 and $n_1$ signal lines 464 (where $m_1$ is an integer equal to or greater than 3 and $n_1$ is an integer equal to or greater than 1) and a first scanning line driving circuit are formed. Likewise, in the second electro-optic device (second panel 202), a second display region 422 (see FIGS. 5A to 5C) including $m_2$ scanning lines 462 and $n_2$ signal lines 464 (where $m_2$ is an integer equal to or greater than 3 and $n_2$ is an integer equal to or greater than 1) and a second scanning line driving circuit are formed. Further, in the third electro-optic device (third panel 203), a third display region including $m_3$ scanning lines 462 and $n_3$ signal lines 464 (where $m_3$ is an integer equal to or greater than 3 and $n_3$ is an integer equal to or greater than 1) and a third scanning line driving circuit are formed. Here, $m_1$, $m_2$, and $m_3$ may be different numbers, but are assumed to be the same as each other in this embodiment, that is, $m_1=m_2=m_3=m$. Further, $n_1$, $n_2$, and $n_3$ may be different numbers, but are assumed to be the same as each other in this embodiment, that is, $n_1=n_2=n_3=n$. Accordingly, in this embodiment, the first display region 421, the second display region 422, and the third display region have the same configuration and are referred to as the display region 42 in FIG. 2. Hereinafter, when it is not necessary to distinguish the first display region 421, the second display region 422, and the third display region from each other, the first display region 421, the second display region 422, and the third display region are simply referred to as the display region 42. In this embodiment, the first, second, and third scanning line driving circuits have the same configuration and are referred to as a scanning line driving circuit 441 in FIG. 2. Hereinafter, when it is not necessary to distinguish the first, second, and third scanning line driving circuits, the first, second, and third scanning line driving circuits are simply referred to as the scanning line driving circuit 441.

A driving circuit 44 is configured to include the scanning line driving circuit 441 that sequentially selects the scanning lines 462 by outputting scanning signals to the scanning lines 462 and a signal line driving circuit 443 that supplies image signals Vij to n (where n is an integer equal to or greater than 1) signal lines 464 in synchronization with the selection of the scanning lines 462. Here, i is an integer from 1 to m and j is an integer from 1 to n. The pixel circuit 48 located at an i row and a j column is supplied with the image signal Vij.

The control device 30 is configured to include a glasses control circuit 31 that controls the stereoscopic glasses 10, a display control circuit 32 that controls the electro-optic device 20, and a storage circuit 33 that stores at least a set value. In this embodiment, as will be described below, an image region in which an image is actually displayed is installed in a part of the display region 42 in which an image can be displayed. In each electro-optic device 20, the storage circuit 33 stores the part in which the image region is installed in the display region 42 as a set value. The control device further includes a supply unit (not illustrated) and a control unit (not illustrated) in the display control circuit 32. The glasses control circuit 31, the display control circuit 32, and the storage circuit 33 can be configured to be mounted on a single integrated circuit, two of these circuits can be configured to be mounted on a single integrated circuit, or the glasses control circuit 31, the display control circuit 32, and the storage circuit 33 can be configured to be distributed to separate integrated circuits.

Configuration of Pixel Circuit

Figure 3:
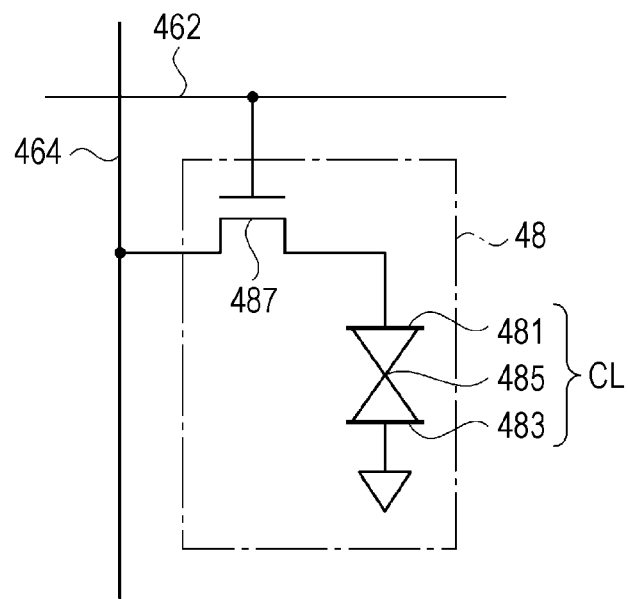
FIG. 3 is a circuit diagram illustrating each pixel circuit.

FIG. 3 is a circuit diagram illustrating each pixel circuit. Next, the configuration of the pixel circuit 48 will be described with reference to FIG. 3.

As illustrated in FIG. 3, each pixel circuit 48 is configured to include a liquid crystal element CL and a selection switch 487. The liquid crystal element CL is an electro-optic element that includes a pixel electrode 481 and a common electrode 483 facing each other and inter-electrode liquid crystal 485. Transmittance of light passing through the liquid crystal 485 is changed according to a voltage applied between the pixel electrode 481 and the common electrode 483.

The selection switch 487 is configured as a N-channel type thin film transistor of which a gate is connected to the scanning line 462 and is interposed between the liquid crystal element CL and the signal line 464 to control electric connection (conduction/non-conduction) between the liquid crystal element CL and the signal line 464. Accordingly, the pixel circuit 48 (liquid crystal element CL) displays a gray scale according to a potential (image signal Vij) of the signal line 464 when the selection switch 487 is controlled to be turned on. An auxiliary capacitor or the like connected to the liquid crystal element CL in parallel is not illustrated.

Scanning Line Driving Circuit

Figure 4:
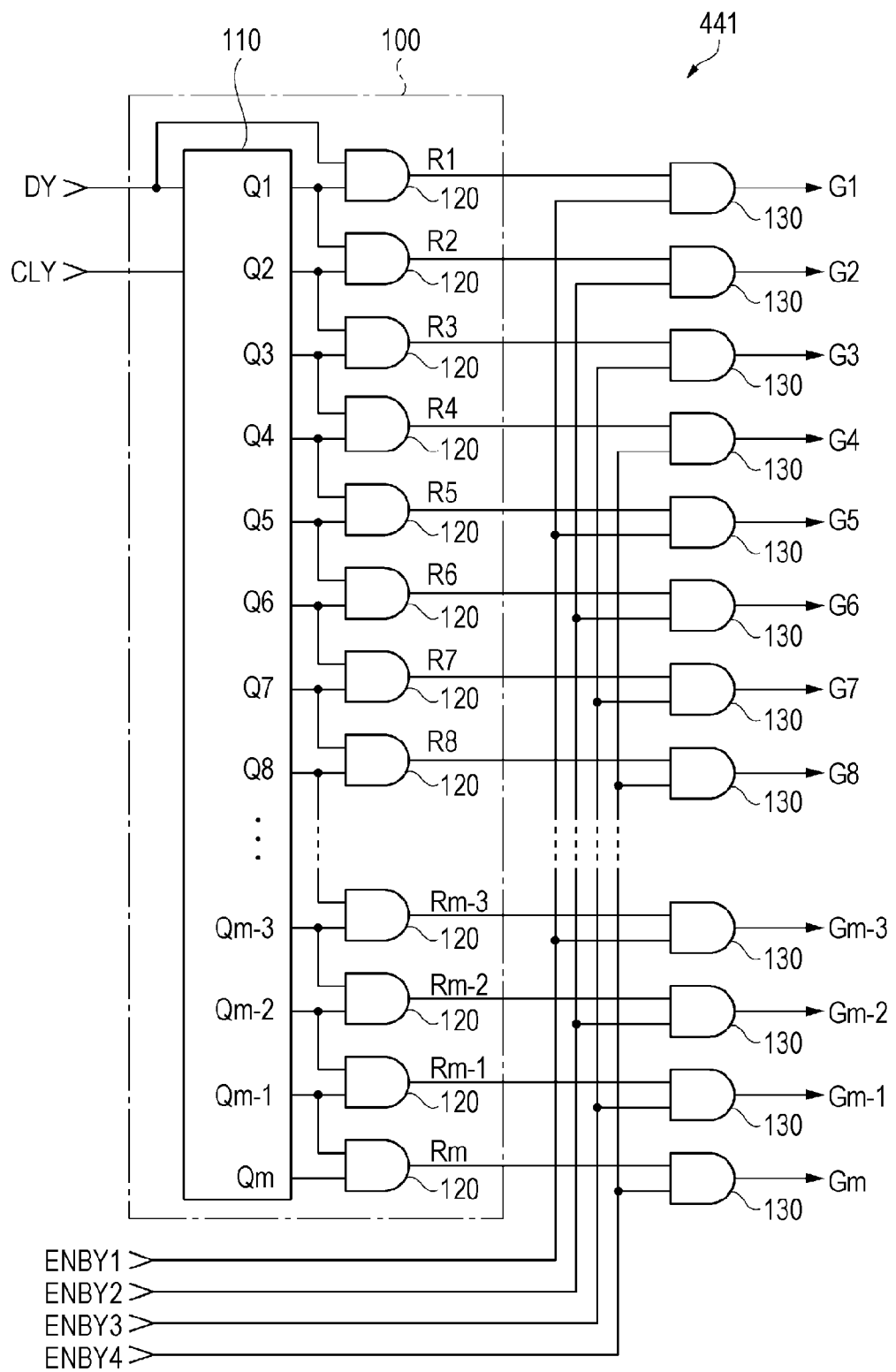
FIG. 4 is a circuit diagram illustrating the configuration of a scanning line driving circuit.

FIG. 4 is a circuit diagram illustrating the configuration of the scanning line driving circuit. Next, the configuration of the scanning line driving circuit 441 will be described with reference to FIG. 4.

The first scanning line driving circuit includes a circuit that can perform sequential scanning to select one scanning line 462 for every one line from $m_1$ scanning lines 462 and perform the line group scanning to select k scanning lines 462 for every k lines from the $m_1$ scanning lines 462 (where k is an integer equal to or greater than 2) and a circuit that can perform interlacing scanning to select one scanning line 462 for every two lines from $m_1$ scanning lines 462. Likewise, the second scanning line driving circuit includes a circuit that can perform sequential scanning to select one scanning line 462 for every one line from $m_2$ scanning lines 462 and perform the line group scanning to select k scanning lines 462 for every k lines from the $m_2$ scanning lines 462 (where k is an integer equal to or greater than 2) and a circuit that can perform interlacing scanning to select one scanning line 462 for every two lines from $m_2$ scanning lines 462. Further, the third scanning line driving circuit includes a circuit that can perform sequential scanning to select one scanning line 462 for every one line from $m_3$ scanning lines 462 and perform the line group scanning to select k scanning lines 462 for every k lines from the $m_3$ scanning lines 462 (where k is an integer equal to or greater than 2) and a circuit that can perform interlacing scanning to select one scanning line 462 every two lines from $m_3$ scanning lines 462. When k is equal to 2, two scanning lines 462 are selected every two lines, which is referred to as line pair scanning.

The sequential scanning refers to a scanning method of sequentially selecting the scanning lines 462 one by one. For example, G1, G2, and G3 are sequentially selected one by one. The line pair scanning refers to a scanning method of sequentially selecting the scanning lines 462 by setting the scanning lines as a pair, for example, by setting G1 and G2 as a pair of lines, setting G3 and G4 as a pair of lines, and setting G5 and G6 as a pair of lines. The line group scanning refers to a scanning method of sequentially selecting the scanning lines 462 by setting k scanning lines as a group, for example, by setting G1, G2, and G3 as a group of three lines, setting G4, G5, and G6 as a group of three lines, and setting G7, G8, and G9 as a group of three lines, for example, when k=3. The interlacing scanning refers to a scanning method of sequentially selecting the scanning lines 462 by interlacing the scanning lines every other line, for example, by selecting G2, G4, and G6.

The control signals supplied from the supply unit of the control device 30 to the electro-optic device 20 include a first start pulse signal supplied to the first scanning line driving circuit, a first clock signal supplied to the first scanning line driving circuit, a first enable signal supplied to the first scanning line driving circuit, a second start pulse signal supplied to the second scanning line driving circuit, a second clock signal supplied to the second scanning line driving circuit, a second enable signal supplied to the second scanning line driving circuit, and a third start pulse signal supplied to the third scanning line driving circuit, a third clock signal supplied to the third scanning line driving circuit, a third enable signal supplied to the third scanning line driving circuit. The first clock signal is used to shift the first start pulse signal and the second clock signal is used to shift the second start pulse signal. The signal shifted by the first clock signal and the first enable signal are logically combined and the signal shifted by the second clock signal and the second enable signal are logically combined. As described above, a prefix word, "first," is prefixed to the control signals supplied to the first scanning line driving circuit, a prefix word, "second," is prefixed to the control signals supplied to the second scanning line driving circuit, and a prefix word, "third," is prefixed to the control signals supplied to the third scanning line driving circuit. However, hereinafter, such prefixes are omitted to simplify the description in some cases. For example, when "a start pulse signal DY supplied to the first panel 201" is written, this start pulse signal DY means the first start pulse signal.

FIG. 4 is a diagram illustrating an example of a circuit configuration capable of performing the above-described various scanning methods. In the following description, the first, second, and third start pulse signals are referred to as start pulse signals DY. The first, second, and third clock signals are referred to as clock signals CLY. The first, second, and third enable signals are referred to as enable signals. As the enable signals, there are four types of signals, that is, an enable 1 signal ENBY1, an enable 2 signal ENBY2, an enable 3 signal ENBY3, and an enable 4 signal ENBY4.

The scanning line driving circuit 441 includes a signal generation circuit 100 and m second AND circuits 130 corresponding to the number of scanning lines 462. The signal generation circuit 100 includes m-stage shift registers 110 and m first AND circuits 120. The shift register 110 is supplied with the start pulse signals DY, the clock signals CLY, and the like by the display control circuit 32.

The shift register 110 outputs transmission pulses Q1, Q2, ..., and Qm by sequentially transmitting the start pulse signals DY in synchronization with the clock signals CLY. An i-th (where i is 1 to m) first AND circuit 120 outputs a logical AND of a transmission pulse Qi-1 (the start pulse signal DY in the first AND circuit 120) of the previous stage and the transmission pulse Qi of the own stage as a control pulse Ri. That is, the signal generation circuit 100 sequentially outputs m-system control pulses R1, R2, ..., and Rm based on the supplied start pulse signals DY and the supplied clock signals CLY. An i-th second AND circuit 130 outputs a logical AND of a control pulse Ri output from the signal generation circuit 100 and an enable p signal ENBYp (where p is one of the integers of 1 to 4) supplied from the display control circuit 32 as a scanning signal to an i-th scanning line Gi. When m second AND circuits 130 are classified into a plurality (m/4) of sets in units of four circuits mutually adjacent to each other, the enable p signal ENBYp is supplied to a p-th (where p=1 to 4) second AND circuit 130 in each set. By realizing such a circuit configuration, it is possible to perform the sequential scanning, the line pair scanning, the line group scanning, the interlacing scanning, and the like.

Electric Alignment

Figure 5A:
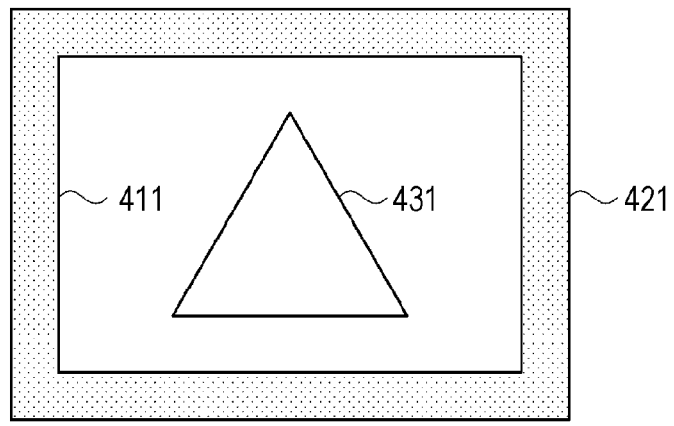
FIGS. 5A to 5C are diagrams illustrating display misalignment caused by electro-optic devices.
Figure 5B:
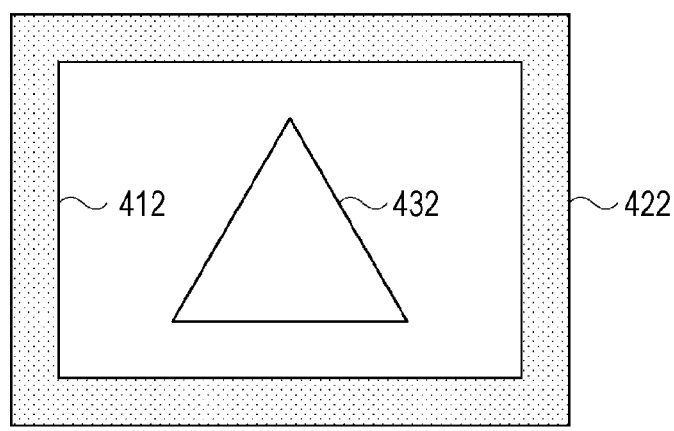
Figure 5C:
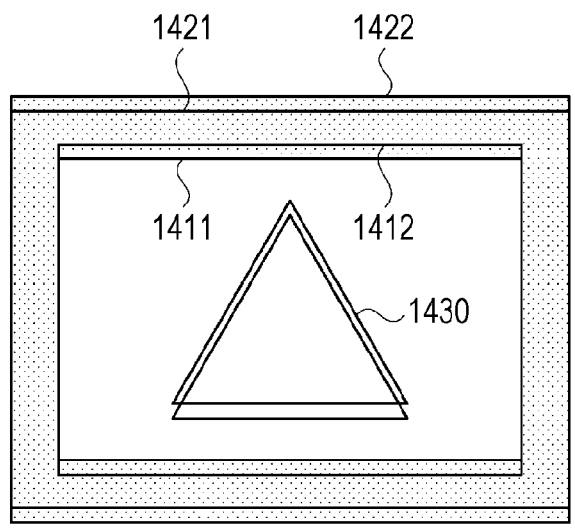
Figure 6A:
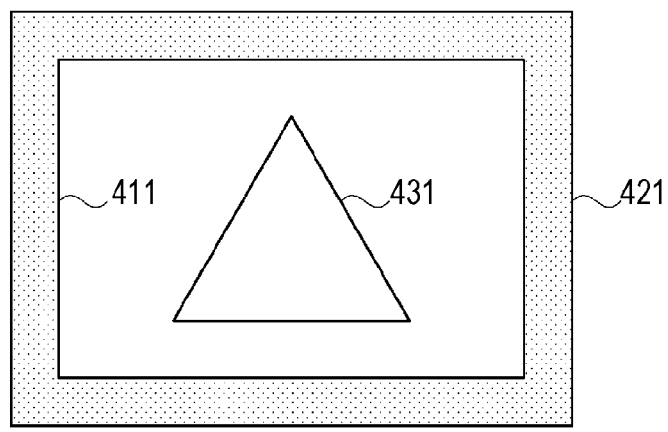
FIGS. 6A to 6C are diagrams illustrating electric alignment.
Figure 6B:
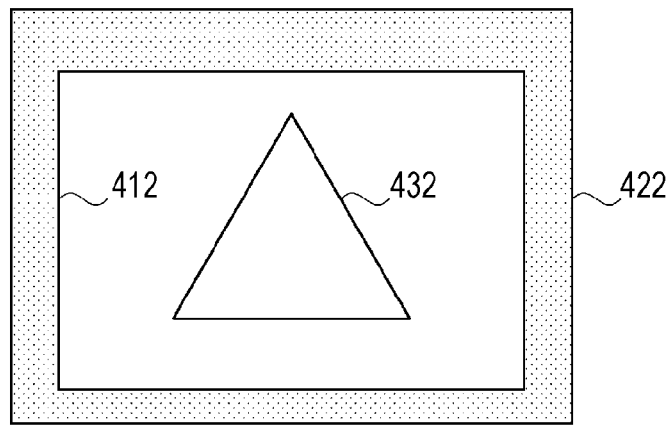
Figure 6C:
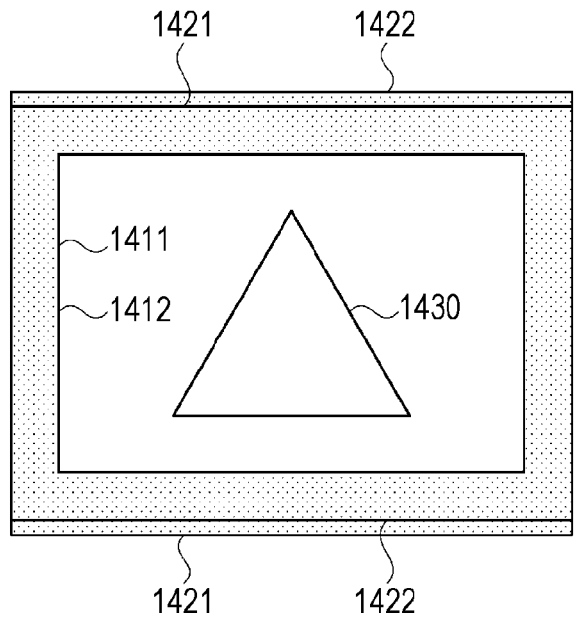

FIGS. 5A to 5C are diagrams illustrating display misalignment caused by the electro-optic devices. FIGS. 6A to 6C are diagrams illustrating electric alignment. Next, an electric alignment method for display images performed by the electro-optic devices 20 will be described with reference to FIGS. 5A to 5C and 6A to 6C.

FIG. 5A illustrates a relation among the first display region 421, the first image region 411, and a first image 431 displayed in the first image region 411 in the first electro-optic device. FIG. 5B illustrates a relation among the second display region 422, a second image region 412, and a second image 432 displayed in the second image region 412 in the second electro-optic device. FIG. 5C illustrates images combined on the projection surface 1400 by the electronic apparatus using the electro-optic devices 20. The electronic apparatus includes a combining device that combines the first image 431, the second image 432, and a third image (not illustrated). Specifically, the projection optical system 1300 corresponds to the combining device. In the electronic apparatus, a plurality of (three in this embodiment) electro-optic devices 20 are used. In order to facilitate the description, however, an alignment method for display images will be described below using the first panel 201 and the second panel 202. At this time, an example will be described in which the first panel 201 is set as a reference and the second panel 202 is matched to the reference. The same method to be described below is applied even to an electronic apparatus that uses three or more electro-optic devices 20.

The display regions (the first display region 421 or the second display region 422, and the third display region) are regions in which images can be displayed by the electro-optic devices 20 (the first or second electro-optic device, and the third electro-optic device). On the other hand, the image regions (the first image region 411 or the second image region 412, and the third image region) are regions in which images are actually displayed in the display regions. Accordingly, the display region is larger than the image region and the number of pixels in the display region is larger than the number of pixels in the image region. Specifically, the number of vertical pixels in the display region is preferably set to be larger by 8 integer multiples than the number of vertical pixels in the image region, and the number of horizontal pixels in the display region is preferably set to be larger only by 8 integer multiples than the number of horizontal pixels in the image region. This is because signal processing can be facilitated. In this embodiment, for example, since the image region corresponds to a full high-vision image with vertical 1080 pixels× horizontal 1920 pixels, the display region has vertical 1088 pixels×horizontal 1936 pixels. In other words, since "$m_1=m_2=m_3=m=1088$" scanning lines 462 and "$n_1=n_2=n_3=n=1936$" signal lines 464 are installed in each of the first display region 421, the second display region 422, and the third display region, a full high-vision image with vertical 1080 pixels×horizontal 1920 pixels is displayed in each display region.

Here, a positional relation of the first image region 411 within the first display region 421 illustrated in FIG. 5A is assumed to be the same as a positional relation of the second image region 412 within the second display region 422 illustrated in FIG. 5B. As a result obtained by projecting the images to the projection surface 1400 by the electronic apparatus, as illustrated in FIG. 5C, a second projected display region 1422 corresponding to the second display region 422 is assumed to be misaligned relative to a first projected display region 1421 corresponding to the first display region 421. In this case, since a second projected image region 1412 corresponding to the second image region 412 is also misaligned relative to a first projected image region 1411 corresponding to the first image region 411, misalignment occurs in a projected image 1430 in which the first image 431 and the second image 432 overlap each other, and thus an exact image is not formed on the projection surface 1400.

A correction method for this case is electric alignment to be described with reference to FIGS. 6A to 6C. FIG. 6A illustrates a relation among the first display region 421, the first image region 411, and the first image 431 displayed in the first image region 411 in the first electro-optic device. FIG. 6B illustrates a relation among the second display region 422, the second image region 412 subjected to the electric alignment, and the second image 432 displayed in the second image region 412 in the second electro-optic device. FIG. 6C illustrates images combined on the projection surface 1400 by the electronic apparatus using the electro-optic device 20. As illustrated in FIG. 5C, when the second projected display region 1422 is misaligned relative to the first projected display region 1421, as illustrated in FIG. 6B, the position of the second image region 412 in the second display region 422 is shifted downward using the control signals. Thus, as illustrated in FIG. 6C, the first projected image region 1411 and the second projected image region 1412 are nearly matched, and thus the misalignment of the projected image 1430 in which the first image 431 and the second image 432 overlap each other is minimized. This method is the electric alignment, and an exact image is formed on the projection surface 1400 through the electric alignment. In the electric alignment relevant to the vertical direction, the position of the image region can be preferably adjusted in units of one scanning line. Hereinafter, this method will be described in detail.

Control Signal

Figure 7A:
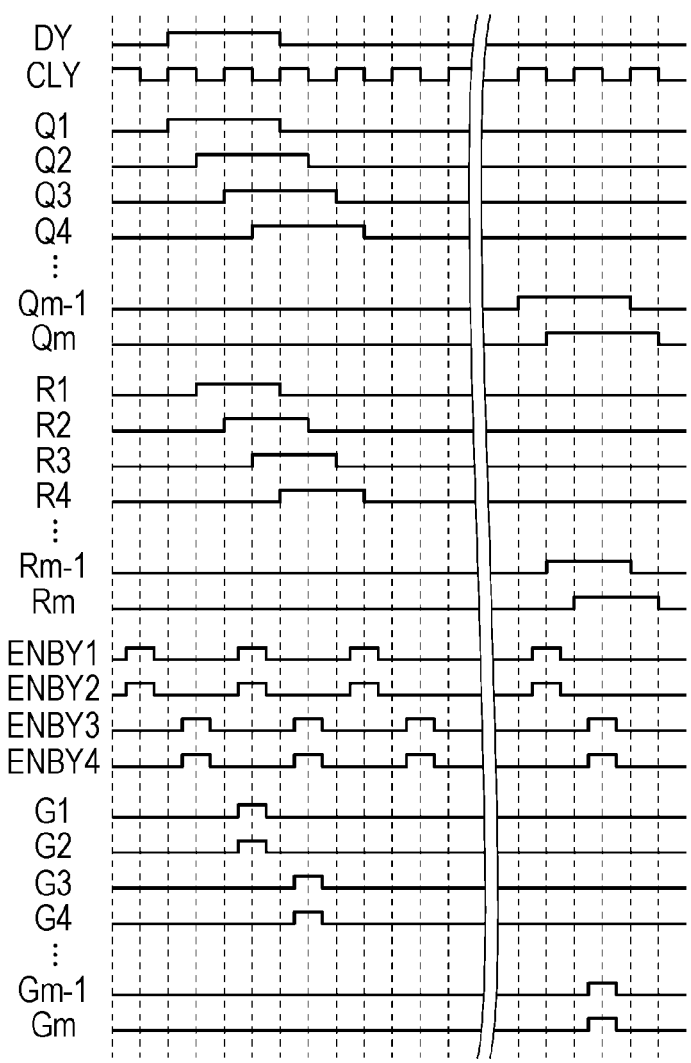
Figure 8A:
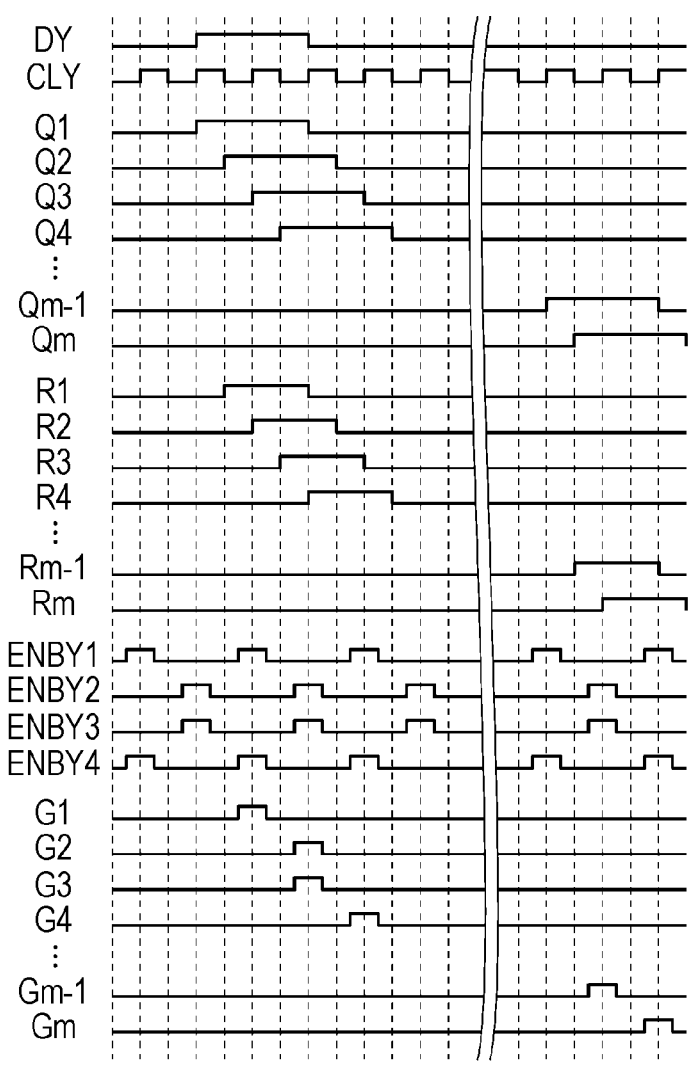

FIGS. 7A to 7C are diagrams illustrating control signals and display images supplied to the first electro-optic device. FIGS. 8A to 8C are diagrams illustrating control signals and display images supplied to the second electro-optic device. Next, the electric alignment method for display images at the time of the line pair scanning will be described with reference to FIGS. 7A to 7C and 8A to 8C. In the following description, an example will be described in which the first panel 201 is set as a reference, the second projected display region 1422 of the second panel 202 is shifted upward only by one scanning line relative to the first projected display region 1421, and thus the position of the second image region 412 in the second display region 422 is shifted downward only by one scanning line.

FIG. 7A is a timing chart illustrating control signals to be supplied when the control device 30 allows the first panel 201 to perform the line group scanning (in FIGS. 7A to 7C, "k=2" and thus the line pair scanning) FIGS. 7B and 7C are diagrams for describing types of signals to be supplied to the pixel circuits 48 connected to the scanning lines 462 at that time.

FIG. 7B illustrates image signals supplied to the signal lines 464 for each row when odd images are displayed. The odd images are images formed using odd-row image signals from a one-frame image (which is referred to as a frame image and a full high-vision image with vertical 1080 pixels× horizontal 1920 pixels in this embodiment) which is an original. In other words, images obtained by selecting images displayed in odd rows from the frame image are odd images. In this embodiment, since 1080 pixels are present in the vertical direction of the one-frame image, the odd images are formed using image signals of odd rows corresponding to 540 rows, such as the first-row image signal V1$j$ of the frame image, the third-row image signal V3$j$ of the frame image, and the fifth-row image signal V5$j$ of the frame image. At this time, as illustrated in FIG. 7B, the same image signal is supplied to the pixel circuits 48 connected to two scanning lines 462 adjacent to each other. For example, the first-row image signal V1$j$ of the frame image is supplied to the pixel circuits 48 connected to the fifth scanning line G5 and the sixth scanning line G6, and then the third-row image signal V3$j$ of the frame image is supplied to the pixel circuits 48 connected to the seventh scanning line G7 and the eighth scanning line G8. Subsequently, likewise, the 1079th-row image signal V1079$j$ of the frame image is supplied to the pixel circuits 48 connected to the 1083rd scanning line G1083 and the 1084th scanning line G1084. Since the first panel 201 is the reference panel, an adjustment region corresponding to four scanning lines is provided above and below each of the first image region 411. A black signal Black is supplied to the pixel circuits 48 of the adjustment regions. In FIG. 7B, the adjustment regions are regions in which the pixel circuits 48 connected to the scanning lines 462 from the first scanning line G1 to the fourth scanning line G4 are located and the pixel circuit 48 connected to the scanning lines 462 from the m-3th scanning line Gm-3 to the m-th scanning line Gm are located.

FIG. 7C illustrates image signals supplied to the signal lines 464 for each row when even images are displayed. The even images are images formed using even-row image signals from a one-frame image which is an original. In other words, images obtained by selecting images displayed in even rows from the frame image are even images. Specifically, the even images are formed using image signals of even rows, such as the second-row image signals V2$j$ of the frame image, the fourth-row image signal V4$j$ of the frame image, and the sixth-row image signal V6$j$ of the frame image. At this time, as illustrated in FIG. 7C, the same image signal is supplied to the pixel circuits 48 connected to two scanning lines 462 adjacent to each other. For example, the second-row image signal V2$j$ of the frame image is supplied to the pixel circuits 48 connected to the fifth scanning line G5 and the sixth scanning line G6, and then the fourth-row image signal V4$j$ of the frame image is supplied to the pixel circuits 48 connected to the seventh scanning line G7 and the eighth scanning line G8. Subsequently, likewise, the 1080th-row image signal V1080$j$ of the frame image is supplied to the pixel circuits 48 connected to the 1083rd scanning line G1083 and the 1084th scanning line G1084. Similarly to the above description, since the first panel 201 is the reference panel, an adjustment region corresponding to four scanning lines is provided in each of the upper and lower portions of the first image region 411. A black signal Black is supplied to the pixel circuits 48 of the adjustment regions.

The timing chart used to describe the control signals supplied to the first panel 201 by the control device 30 in order to display the above-described odd or even images is FIG. 7A. When the electro-optic devices 20 perform the line pair scanning, the above-described odd and even images can be displayed and the control device 30 can generate the control signals enabling the images to be displayed. That is, when shifting the display position of the second image by one scanning line, the control unit of the control device 30 shifts the phase of the second start pulse signal by half of one horizontal scanning period of the line group scanning, shifts the phase of the second clock signal by half of one horizontal scanning period of the line group scanning, and shifts the phase of the second enable signal by one horizontal scanning period of the line group scanning. The control unit can control the phases of various signals such as the first start pulse signal, the second start pulse signal, the third start pulse signal, the first clock signal, the second clock signal, and the third clock signal based on the set value n stored in the storage circuit. As illustrated in FIG. 7A, two-system control pulses adjacent to each other have a mutually overlapping section among the m-system control pulses R1, R2, . . . , and Rm. During a period in which 2-system control pulses R adjacent to each other overlap with each other, the enable signals ENBY supplied to the second AND circuits 130 corresponding to these control pulses R are simultaneously set to an active level. For example, during a period in which the control pulses R1 and R2 overlap with each other, the enable 1 signal ENBY1 and the enable 2 signal ENBY2 are simultaneously set to the active level. During a period in which the control pulses R3 and R4 overlap with each other, the enable 3 signal ENBY3 and the enable 4 signal ENBY4 are simultaneously set to the active level. In this way, the scanning signals supplied to two scanning lines 462 adjacent to each other are simultaneously set to the active level, and thus the line pair scanning is realized.

FIG. 8A is a timing chart illustrating control signals to be supplied when the control device 30 allows the second panel 202 to perform the line group scanning (in FIGS. 8A to 8C, "k=2" and thus the line pair scanning) FIGS. 8B and 8C are diagrams for describing types of signals to be supplied to the pixel circuits 48 connected to the scanning lines 462 at that time.

FIG. 8B illustrates the image signals supplied to the signal lines 464 for each row when odd images are displayed on the second panel 202. The position of the second image region 412 in the second display region 422 of the second panel 202 is shifted downward only by one scanning line with respect to the positional relation of the first image region 411 in the first display region 421 of the first panel 201. To display the odd images on the second panel 202 under this condition, as shown in FIG. 8B, an adjustment region corresponding to five scanning lines is provided above the second image region 412, an adjustment region corresponding to three scanning lines is provided below the second image region 412, and a black signal Black is supplied to the pixel circuits 48 of the adjustment regions. In FIG. 8B, the adjustment regions are regions in which the pixel circuits 48 connected to the scanning lines 462 from the first scanning line G1 to the fifth scanning line G5 are located and the pixel circuits 48 connected to the scanning lines 462 from the m-2th scanning line Gm-2 to the m-th scanning line Gm are located. In the second pixel region other than the adjustment regions, similarly to the above description, the same image signal is supplied to the pixel circuits 48 connected to two scanning lines 462 adjacent to each other. For example, the first-row image signal V1$j$ of the frame image is supplied to the pixel circuits 48 connected to the sixth scanning line G6 and the seventh scanning line G7 and the third-row image signal V3$j$ of the frame image is supplied to the pixel circuits 48 connected to the eighth scanning line G8 and the ninth scanning line G9. Subsequently, likewise, the 1079th-row image signal V1079$j$ of the frame image is supplied to the pixel circuits 48 connected to the 1084th scanning line G1084 and the 1085th scanning line G1085.

FIG. 8C illustrates image signals supplied to the signal lines 464 for each row when even images are displayed on the second panel 202. Similarly to the above description, since the second image region 412 is misaligned downward only by one scanning line relative to the first image region 411, an adjustment region corresponding to five scanning lines is provided above the second image region 412, an adjustment region corresponding to three scanning lines is provided below the second image region 412, and a black signal Black is supplied to the pixel circuits 48 of the adjustment regions. In this state, as illustrated in FIG. 8C, the same image signal is supplied to the pixel circuits 48 connected to two scanning lines 462 adjacent to each other. For example, the second-row image signal V2*j* of the frame image is supplied to the pixel circuits 48 connected to the sixth scanning line G6 and the seventh scanning line G7 and the fourth-row image signal V4*j* of the frame image is supplied to the pixel circuits 48 connected to the eighth scanning line G8 and the ninth scanning line G9. Subsequently, likewise, the 1080th image signal V1080*j* of the frame image is supplied to the pixel circuits 48 connected to the 1084th scanning line G1084 and the 1085th scanning line G1085.

The timing chart used to describe the control signals supplied to the second panel 202 by the control device 30 in order to display the above-described odd or even images is FIG. 8A. In other words, the control signals are control signals that shift the position of the second image region 412 in the second display region 422 downward only by one scanning line by the control signal when the line pair scanning is performed by the second panel 202.

The control device 30 can temporarily shift the first start pulse signal (DY in FIG. 7A) and the second start pulse signal (DY in FIG. 8A) only by an integer multiple of half of a horizontal scanning period of the line group scanning. As understood from the signals supplied to the scanning line G1 to the scanning line Gm in FIG. 8A, the horizontal scanning period of the line group scanning is one period of the clock signal CLY. Accordingly, the half of the horizontal scanning period is half of the period of the clock signal CLY. The control device 30 can shift the second start pulse signal only by an integer multiple of the half of the period of the clock signal CLY before and after the first start pulse signal. In practice, the second start pulse signal (DY in FIG. 8A) is delayed by one time of the half of the period of the clock signal CLY than the first start pulse signal (DY in FIG. 7A). The period of the clock signal CLY may be set to differ according to a scanning method. Specifically, when the period of the clock signal CLY is assumed to be 1 at the time of the sequential scanning, the period of the clock signal CLY is ½ (the frequency is doubled) at the time of the line pair scanning (the line group scanning of "k=2") and the period of the clock signal CLY of k-line group scanning is 1/k (the frequency is k multiple). Likewise, the horizontal scanning period can be set to differ according to a scanning method. Similarly to the above description, when the horizontal scanning period of the sequential scanning is set as a reference, the horizontal scanning period at the time of the line pair scanning (the line group scanning of "k=2") is ½ times the horizontal scanning period at the time of the sequential scanning, and the horizontal scanning period at the time of the k-line group scanning is 1/k times the horizontal scanning period at the time of the sequential scanning.

The control device 30 can set the first clock signal (CLY in FIG. 7A) and the second clock signal (CLY in FIG. 8A) to have the same period and set the phases to differ from each other. In practice, the second clock signal (CLY in FIG. 8A) has the same period as the first clock signal (CLY in FIG. 7A), and has a phase shifted by 180°. That is, the second clock signal (CLY in FIG. 8A) is temporarily shifted only by an integer multiple (one time in FIGS. 7A to 7C and 8A to 8C) of half of the horizontal scanning period at the same period relative to the first clock signal (CLY in FIG. 7A). As a result, when the first clock signal (CLY in FIG. 7A) is in an active level (high potential), the second clock signal (CLY in FIG. 8A) is in an inactive level (low potential). When the first clock signal (CLY in FIG. 7A) is in the inactive level (low potential), the second clock signal (CLY in FIG. 8A) is in the active level (high potential).

The control device 30 can set the first enable signal (ENBY1, ENBY2, ENBY3, or ENBY4 in FIG. 7A) and the second enable signal (ENBY1, ENBY2, ENBY3, or ENBY4 in FIG. 8A) to differ from each other. Specifically, the control device 30 can change a timing at which the enable signal is activated for each electro-optic device 20 supplying the control signals. The control device 30 can shift the phase of the second enable signal by one horizontal scanning period of the line group scanning than the phase of the first enable signal. In other words, the control device 30 can arbitrarily set the active level (high potential) state using the enable 1 signal ENBY1, the enable 2 signal ENBY2, the enable 3 signal ENBY3, and the enable 4 signal ENBY4. In practice, in the first enable signal (ENBY1, ENBY2, ENBY3, or ENBY4 in FIG. 7A), the enable 1 signal ENBY1 and the enable 2 signal ENBY2 are paired and the enable 3 signal ENBY3 and the enable 4 signal ENBY4 are paired, so that each pair of signals is set as the same signal. In the second enable signal (ENBY1, ENBY2, ENBY3, or ENBY4 in FIG. 8A), however, the enable 1 signal ENBY1 and the enable 4 signal ENBY4 are paired and the enable 2 signal ENBY2 and the enable 3 signal ENBY3 are paired. In this case, the enable 1 signal ENBY1 and the enable 3 signal ENBY3 are the same between the first enable signal and the second enable signal. However, the phases of the enable 2 signal ENBY2 and the enable 4 signal ENBY4 of the second enable signal are shifted by one horizontal scanning period of the line group scanning relative to the enable 2 signal ENBY2 and the enable 4 signal ENBY4 of the first enable signal.

As the result of the control signals, the paired scanning lines 462 are shifted by one line between the line pair scanning in the first panel 201 and the line pair scanning in the second panel 202, and thus the position of the second image region 412 in the second display region 422 can be shifted downward only by one scanning line through the line pair scanning Additionally, the electric alignment is realized by shifting the image signals illustrated in FIG. 8B or 8C according to the rows. In general, when the position of the second image region 412 in the second display region 422 is shifted only by 2q−1 (where q is an integer including a zero, positive, or negative value) scanning lines, the control device 30 sets the signals other than the second start pulse signal to be the same as those illustrated in FIG. 8A and supplies a control signal obtained by temporarily shifting the second start pulse signal only by a 2q−1 multiple of half (half of the period of the clock signal CLY) of the horizontal scanning line of the line group scanning relative to the first start pulse signal (DY in FIG. 7A). When the position of the second image region 412 in the second display region 422 is shifted only by 2q scanning lines (where q is an integer including a zero, positive, or negative value), the control device 30 sets the signals other than the second start pulse signal to be the same as those illustrated in FIG. 7A and supplies a control signal obtained by temporarily shifting the second start pulse signal only by a 2q multiple of half (half of the period of the clock signal CLY) of the horizontal scanning period of the line group scanning relative to the first start pulse signal (DY in FIG. 7A).

As illustrated in FIG. 7A or 8A, the control signals have a plurality of output patterns. The control device 30 supplies the control signals with optimum output patterns from the plurality of output patterns to each electro-optic device 20 according to the set value. For example, as described in this embodiment, the electric alignment can be achieved by supplying the output patterns (forms of the control signals) illustrated in FIG. 7A to the first panel 201 and supplying the output patterns illustrated in FIG. 8A to the second panel 202. Thus, the control device 30 can supply the output patterns such that the position of the image formed by the first electro-optic device is the closest to the position of the image formed by the second electro-optic device.

Formation 1 of High-Definition Image

Figure 9A:
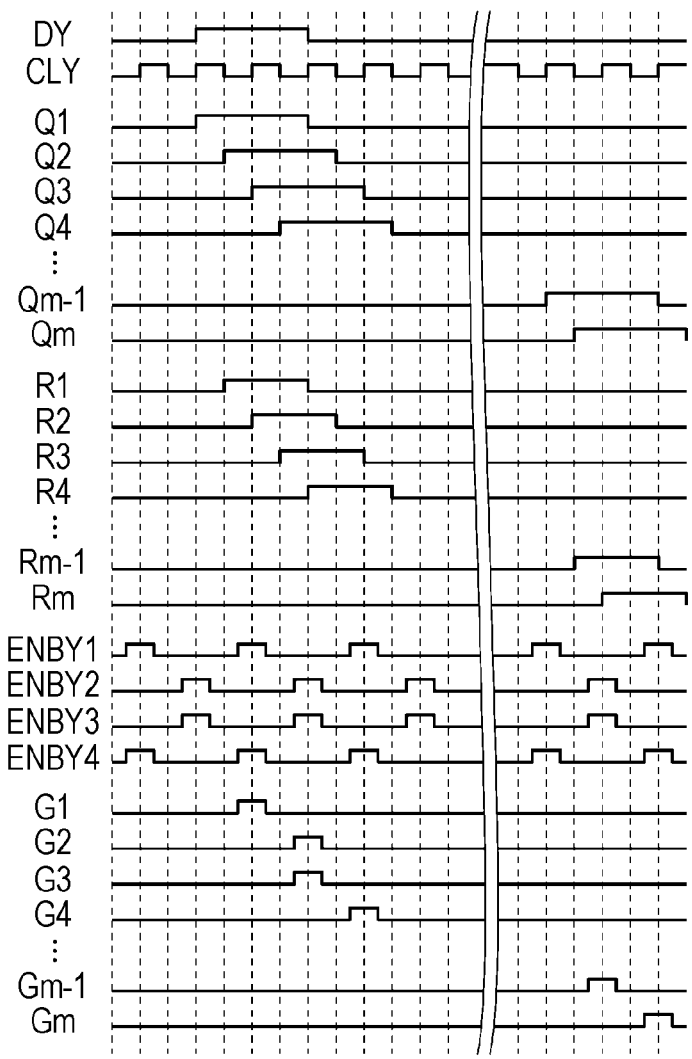
Figure 10A:
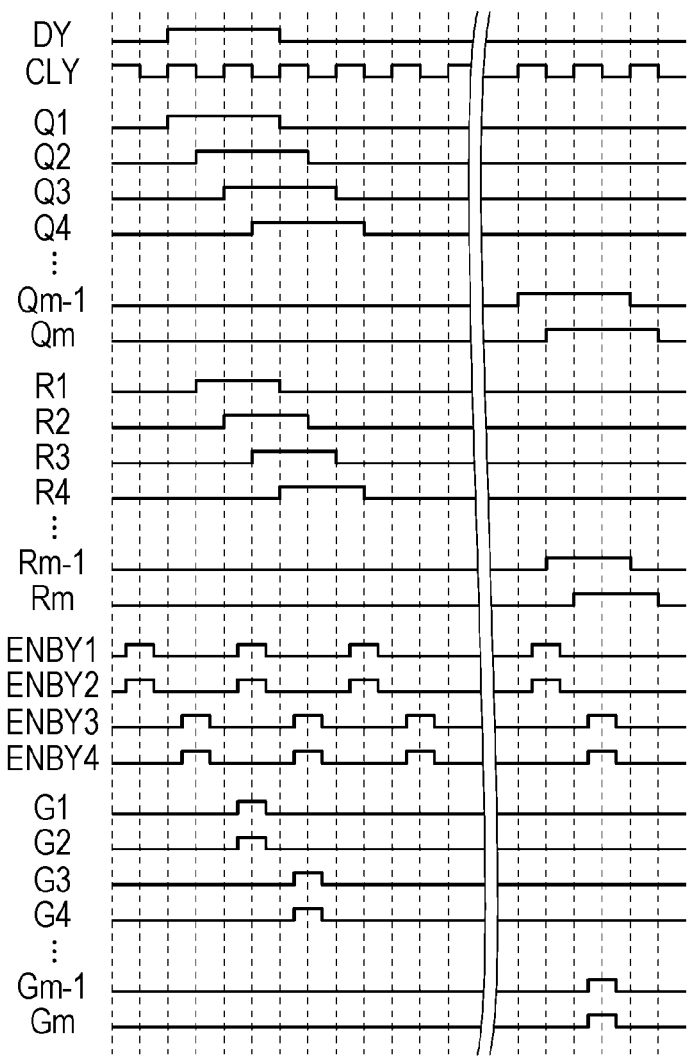

FIGS. 9A to 9C are diagrams illustrating control signals and display images supplied to the first electro-optic device. FIGS. 10A to 10C are diagrams illustrating control signals and display images supplied to the second electro-optic device. Next, high-definition image display methods using the line pair scanning will be described with reference to FIGS. 9A to 9C and 10A to 10C.

As a first method of forming a high-definition image, a method of forming the high-definition image including at least first and second field images will be described. Here, the line pair scanning and shifted line pair scanning are performed. FIG. 9A is a timing chart illustrating control signals supplied when the control device 30 performs the line group scanning (in FIGS. 9A to 9C, "k=2" and thus the line pair scanning) on the first panel 201 and displays the second field image. FIG. 9B is a diagram for describing types of signals supplied to the pixel circuits 48 connected to the scanning lines 462 when the first field image is displayed on the first panel 201. FIG. 9C is a diagram for describing types of signals supplied to the pixel circuits 48 connected to the scanning lines 462 when the second field image is displayed on the first panel 201. The first and second field images are formed using the line pair scanning.

To display a high-definition image at high speed using the line pair scanning, odd images are displayed in the first field and even images are displayed in the second field. With regard to the odd and even images, as understood by comparison of FIGS. 9B and 9C, the first image region 411 is shifted only by one scanning line. Line pair scanning in which the second image region 412 of the second field is shifted only by one scanning line relative to the first image region 411 of the first field is referred to as shifted line pair scanning.

First, to display an odd image in the first field, as illustrated in FIG. 9B, the same line pair scanning as that of FIG. 7B is performed. Since not only the position of the first image region 411 but also the combination of the simultaneously selected scanning lines 462 are the same as those of FIG. 7B, the control signals supplied to the scanning line driving circuit of the first panel 201 in the first field are the same as those of FIG. 7A.

In the second field, an even image is displayed using the shifted line pair scanning. As illustrated in FIG. 9C, paired scanning lines 462 are shifted by one line between the line pair scanning in the first field and the line pair scanning (shifted line pair scanning) in the second field. As illustrated in FIG. 9B, in the first field, the fifth scanning line G5 and the sixth scanning line G6 are simultaneously selected. Subsequently, likewise, the seventh scanning line G7 and the eighth scanning line G8 are simultaneously selected. On the other hand, as illustrated in FIG. 9C, in the second field, the sixth scanning line G6 and the seventh scanning line G7 shifted by one line relative to the combination of the scanning lines 462 in the first field are simultaneously selected. Subsequently, likewise, the eighth scanning line G8 and the ninth scanning line G9 are simultaneously selected. The display in the second field is realized as in FIG. 8C. Accordingly, the control signals supplied to the scanning line driving circuit of the first panel 201 are the same as those of FIG. 8A and are illustrated in FIG. 9A.

When the second image region 412 is misaligned relative to the first image region 411, the control signals supplied to the second panel 202 are changed similarly to the above description. Hereinafter, a display method will be described giving an example in which the second image region 412 is misaligned by the degree equal to or less than one scanning line relative to the first image region 411.

FIG. 10A is a timing chart illustrating control signals supplied when the control device 30 performs the line group scanning (in FIGS. 10A to 10C, "k=2" and thus the line pair scanning) on the second panel 202 and displays the second field image. FIG. 10B is a diagram for describing types of signals supplied to the pixel circuits 48 connected to the scanning lines 462 when the first field image is displayed on the second panel 202. FIG. 10C is a diagram for describing types of signals supplied to the pixel circuits 48 connected to the scanning lines 462 when the second field image is displayed on the second panel 202.

To display an odd image in the first field on the second panel 202, as illustrated in FIG. 10B, the same line pair scanning as that of FIG. 8B is performed. Since not only the position of the image region but also the combination of the simultaneously selected scanning lines 462 are the same as those of FIG. 8A, the control signals supplied to the scanning line driving circuit of the second panel 202 in the first field are the same as those of FIG. 8A.

In the second field, an even image is displayed on the second panel 202. As illustrated in FIG. 10C, paired scanning lines 462 are shifted by one line between the line pair scanning in the first field and the line pair scanning in the second field. The display in the second field is the same as that of FIG. 7C except for the types of image signals. The second image region 412 in the second field is shifted by two scanning lines relative to the first image region 411 illustrated in FIG. 7C. Accordingly, the control signals supplied to the scanning line driving circuit of the second panel 202 are the same as those of FIG. 7A and are illustrated in FIG. 10A.

The second field image is an even image when the first field image is an odd image. The second field image is an odd image when the first field image is an even image. Accordingly, on the contrary to the above-described example, an even image may be displayed in the first field and an odd image may be displayed in the second field.

Thus, when the line pair scanning is used to form the first and second field images, a high-definition image can be displayed at a high speed. According to this method, even when the line pair scanning in which the first and second electro-optic devices simultaneously select two scanning lines 462 is performed by the first and second electric-optic devices, the position of an image formed by the first electro-optic device and the position of an image performed by the second electro-optic device can be changed in units of one scanning line. In other words, even when a high-definition image is displayed at a high speed using the line pair scanning, the position of a display image can be minutely adjusted, and thus a high-quality image can be displayed.

Display of Three-Dimensional Image

Figure 11:
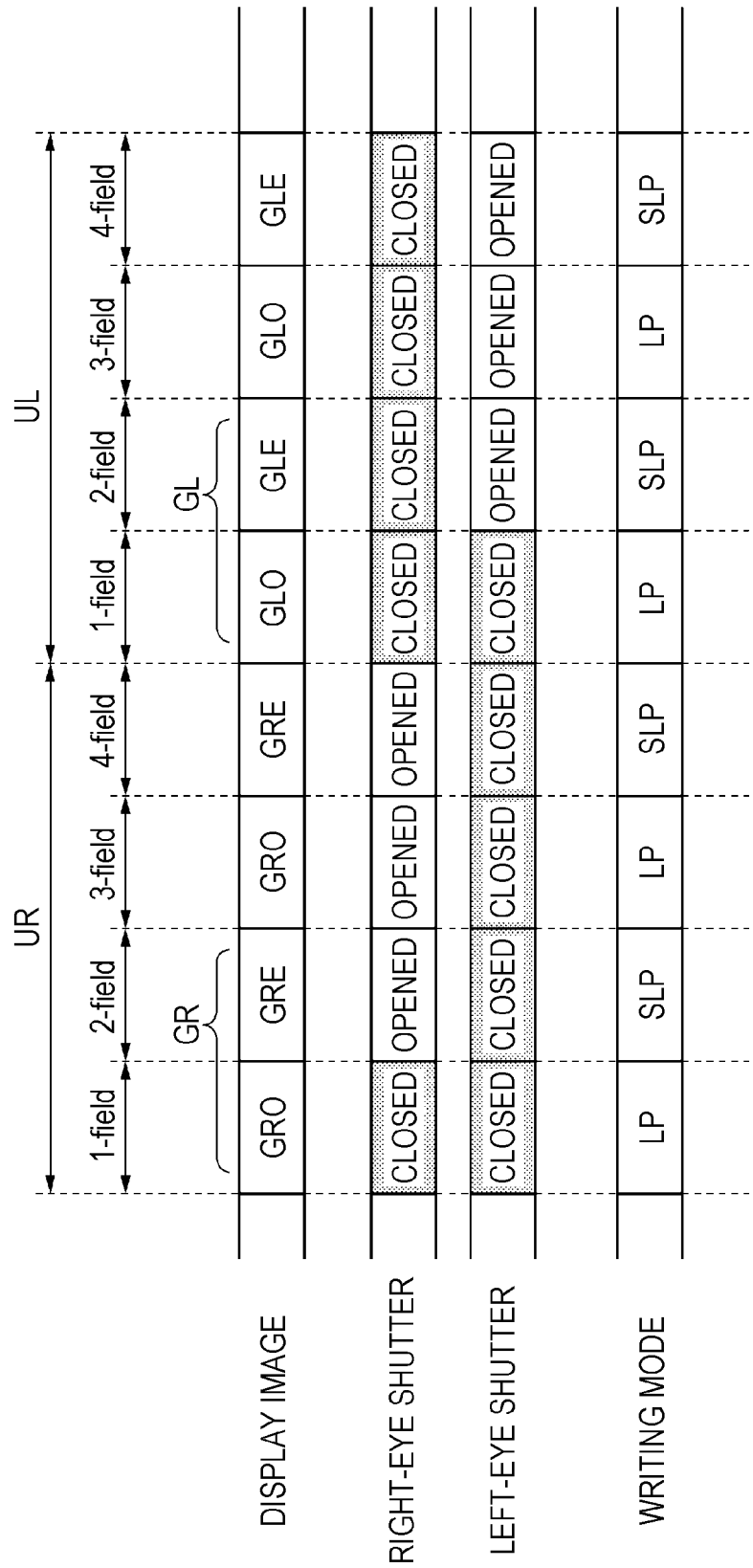
FIG. 11 is a diagram illustrating a method of displaying a three-dimensional image using the electronic apparatus.

FIG. 11 is a diagram illustrating a method of displaying a three-dimensional image using the electronic apparatus. Next, display of a three-dimensional image using the display of the high-definition image described above will be described with reference to FIG. 11.

The display of a high-definition image described above can be applied to display of a three-dimensional image. To display a three-dimensional image, as illustrated in FIG. 11, right-eye frame images GR and left-eye frame images GL are displayed alternately two by two. That is, to display a stereoscopic image, the display control circuit 32 of the control device 30 controls the electro-optic devices 20 such that the right-eye frame images GR and the left-eye frame images GL to which parallax is mutually assigned are displayed in a time division manner. A period in which two frame images are displayed is referred to as a unit period U. A period in which the right-eye frame images GR are displayed twice is a right unit period UR. A period in which the left-eye frames GL are displayed twice is a left unit period UL. The right unit period UR and the left unit period UL are alternately set. Two frame images include first, second, third, and fourth field images. The first field image is formed during a first field period 1-field, the second field image is formed during a second field period 2-field, the third field image is formed during a third field period 3-field, and the fourth field image is formed during a fourth field period 4-field. The first and third field images are the same odd image and the second and fourth field images are the same even image. During the first field period 1-field and the third field period 3-field of the right unit period UR, odd images GRO of the right-eye frame images GR are formed. During the second field period 2-field and the fourth field period 4-field of the right unit period UR, even images GRE of the right-eye frame images GR are formed. Likewise, during the first field period 1-field and the third field period 3-field of the left unit period UL, odd images GLO of the left-eye frame images GL are formed. During the second field period 2-field and the fourth field period 4-field of the left unit period UL, even images GLE of the left-eye frame images GL are formed. During the first field period 1-field of the right unit period UR, the left-eye frame image GL displayed during the fourth field period 4-field of the immediately previous left unit period UL is rewritten to the right-eye frame image GR. During the first field period 1-field of the left unit period UL, the right-eye frame image GR displayed during the fourth field period 4-field of the immediately previous right unit period UR is rewritten to the left-eye frame image GL.

The display control circuit 32 selects a writing mode during each field period and appropriately controls the driving circuit 44. The writing mode includes line pair scanning LP and shifted line pair scanning SLP. The first and third field images are formed through the ling pair scanning LP. The second and fourth field images are formed through the shifted line pair scanning SLP.

The control device 30 opens the right-eye shutter from the second field period 2-field to the fourth field period 4-field of the right unit period UR and closes the right-eye shutter during the other periods through the glasses control circuit 31. Likewise, the control device 30 opens the left-eye shutter from the second field period 2-field to the fourth field period 4-field of the left unit period UL and closes the left-eye shutter during the other periods through the glasses control circuit 31. Thus, the right-eye shutter can be opened during a period of ⅜ of the right unit period UR and the left-eye shutter can be opened during a period of ⅜ of the left unit period UL. Accordingly, bright display can be realized in three-dimensional display and the electric alignment can be adjusted in units of one scanning line. Further, the first projected image region 1411 and the second projected image region 1412 are nearly matched. Therefore, the misalignment of the projected image 1430 in which the first image 431 and the second image 432 overlap each other is minimized.

On the contrary to the above description, the first and third field images may be set to even images and the second and fourth field images may be set to odd images.

Sequential Scanning

Figure 12A:
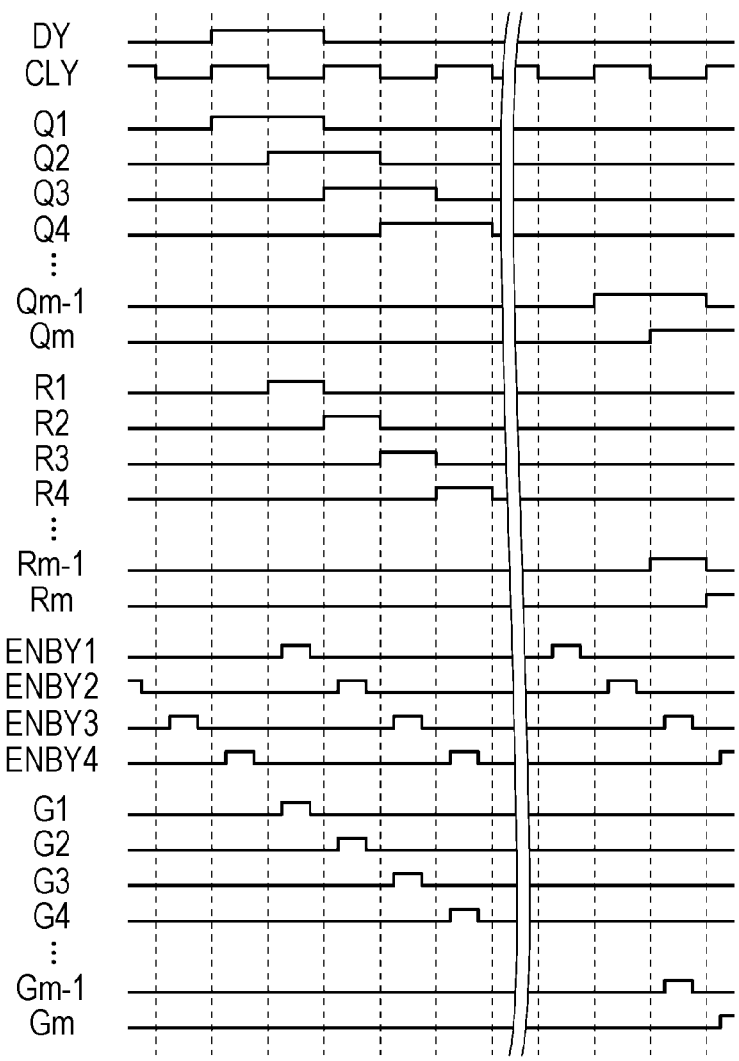
FIGS. 12A and 12B are diagrams illustrating control signals supplied to the electro-optic devices when sequential scanning is performed.
Figure 12B:
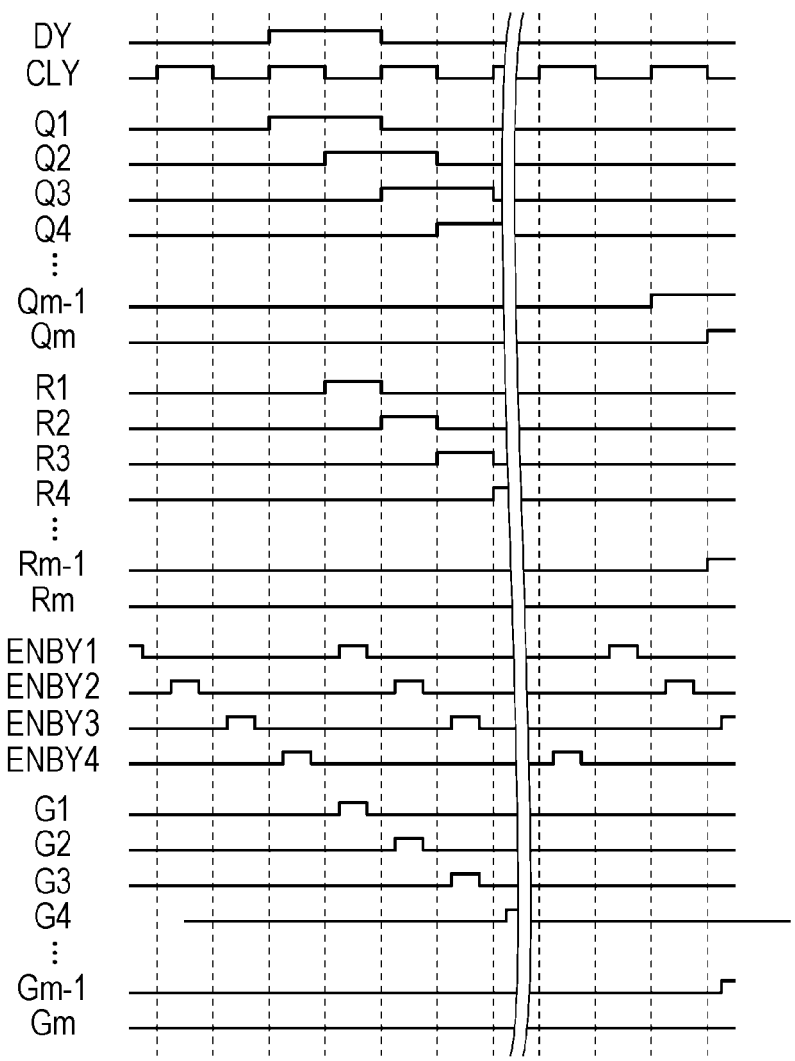

FIGS. 12A and 12B are diagrams illustrating control signals supplied to the electro-optic devices when sequential scanning is performed. FIG. 12A illustrates the control signals supplied to the first electro-optic device and FIG. 12B illustrates the control signals supplied to the second electro-optic device. Next, image display using the sequential scanning will be described with reference to FIGS. 12A and 12B.

The sequential scanning refers to a scanning method of sequentially selecting the scanning lines 462 for every one line. That is, the sequential scanning refers to a method of sequentially selecting the scanning lines 462 for every one row in such a manner that the first scanning line G1 is selected, the second scanning line G2 is selected, and then the third scanning line G3 is selected. To perform the sequential scanning, the first scanning line driving circuit includes a circuit that performs sequential scanning to select one scanning line 462 for every one line from the $m_1$ scanning lines 462, the second scanning line driving circuit includes a circuit that performs sequential scanning to select one scanning line 462 for every one line from the $m_2$ scanning lines 462, and the third scanning line driving circuit includes a circuit that performs sequential scanning to select one scanning line 462 for every one line from the $m_3$ scanning lines 462. These scanning line driving circuits have the same configuration as that of FIG. 4 so that the control signals supplied by the control device 30 can be changed.

FIG. 12A is a timing chart illustrating control signals supplied when the control device 30 performs the sequential scanning and displays the frame image on the first panel 201. FIG. 12B is a timing chart illustrating control signals supplied when the control device 30 performs the sequential scanning and displays the frame image on the second panel 202. The control device 30 can generate these control signals. Hereinafter, a display method will be described giving an example in which the second image region 412 is assumed to be misaligned relative to the first image region 411 and the control signals (FIG. 12B) supplied to the second panel 202 are changed from the control signals supplied to the first panel 201 using the first panel 201 as a reference similarly to the above description.

To perform the sequential scanning in the first panel 201, the control signals illustrated in FIG. 12A are supplied to the scanning line driving circuit illustrated in FIG. 4. When a period in which the start pulse signal DY is in an active level (high potential) is set to be longer than half of the period of the clock signal CLY and be shorter than one period of the clock signal CLY and two transition periods (each of which is a transition period of the clock signal CLY from an inactive level (low potential) to the active level (high potential) or a transition period of the clock signal CLY from the active level (high potential) to the inactive level (low potential)) of the clock signal CLY are set to be included within the period in which the start pulse signal DY is in the active level, a period in which the transmission pulses Q1, Q2, . . . , and Qm are in the active level (high potential) corresponds to one period of the clock signal CLY. Therefore, a period in which the control pulses R1, R2, . . . , and Rm are in the active level (high potential) corresponds to half of the period of the clock signal CLY. A period in which the enable p signal ENBYp (where p is an integer of 1 to 4) is in the active level (high potential) is set to be shorter than the half of the period of the clock signal CLY. Further, when the period in which the enable p signal ENBYp is in the active level (high potential) is set to be within the period in which the control pulses R1, R2, . . . , and Rm are sequentially in the active level, a selection signal to the scanning lines 462 is divided without interference between the adjacent scanning lines 462, so that the first scanning line G1, the second scanning line G2, and the third scanning line G3, and the fourth scanning line G4 are sequentially selected. By allowing the control device 30 to supply these control signals, the sequential scanning is realized in the first panel 201.

To perform the sequential scanning in the second panel 202 and shift the second image region 412 by one scanning line relative to the first image region 411, the control signals illustrated in FIG. 12B are supplied to the scanning line driving circuit illustrated in FIG. 4. In general, to shift the second image region 412 by q scanning lines relative to the first image region 411, the second start pulse signal DY and the second enable p signal ENBYp (illustrated in FIG. 12B) supplied to the second panel 202 are temporarily shifted by a q multiple of the half of the period of the clock signal CLY relative to the first start pulse signal DY and the first enable p signal ENBYp (illustrated in FIG. 12A) supplied to the first panel 201. Further, the phase of the second clock signal CLY (illustrated in FIG. 12B) supplied to the second panel 202 is shifted by a q multiple of 180° relative to the first clock signal CLY (illustrated in FIG. 12A) supplied to the first panel 201. In practice, the second start pulse signal DY and the second enable p signal ENBYp in FIG. 12B are temporarily shifted by one time of the half of the period of the clock signal CLY relative to the first start pulse signal DY and the first enable p signal ENBYp in FIG. 12A. Further, the phase of the second clock signal CLY in FIG. 12B is shifted by 180° relative to the first clock signal CLY in FIG. 12A. Thus, even in the sequential scanning, the position of the image region can be minutely adjusted one scanning line by one scanning line.

Second Embodiment

Formation 2 of High-Definition Image

Figure 13A:
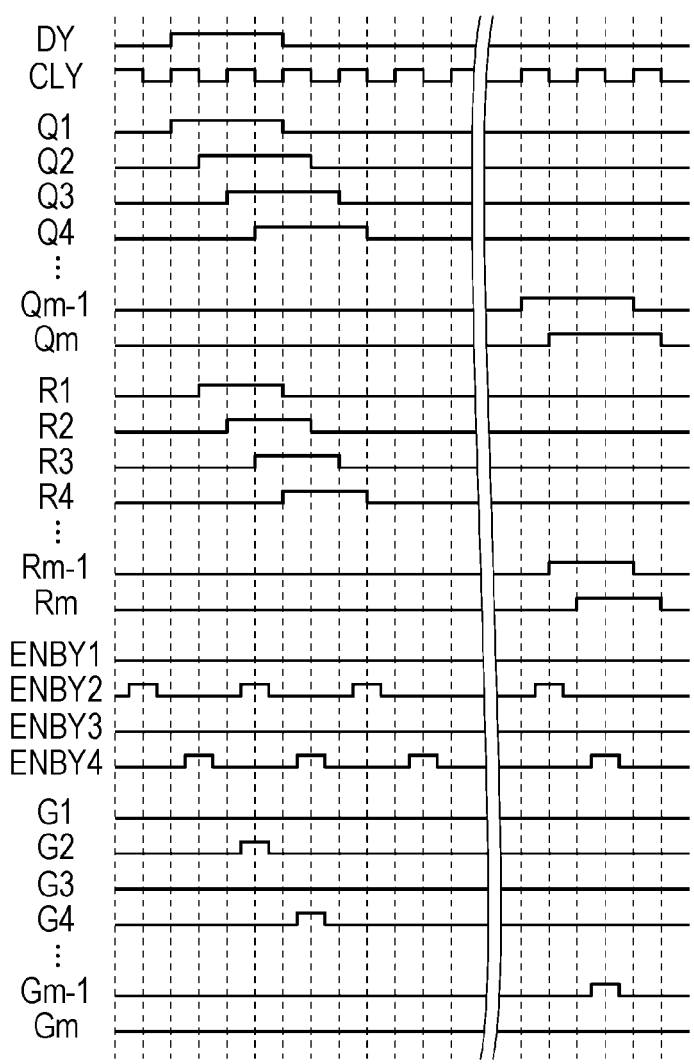
Figure 14A:
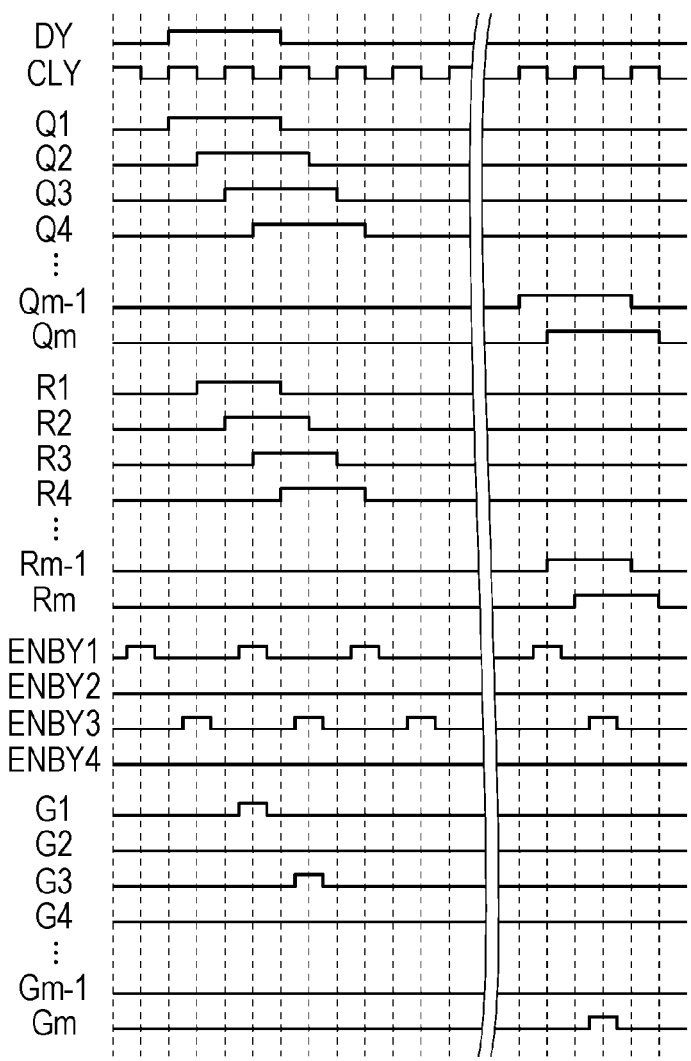

FIGS. 13A to 13C are diagrams illustrating control signals and display images supplied to a first electro-optic device according to a second embodiment. FIGS. 14A to 14C are diagrams illustrating control signals and display images supplied to a second electro-optic device according to the second embodiment. Next, display of a high-definition image using line pair scanning and interlacing scanning will be described with reference to FIGS. 13A to 13C and 14A to 14C. The same reference numerals are given to the same constituent elements as those of the first embodiment and the repeated description will be omitted.

This embodiment is different from the first embodiment in a method of forming a high-definition image. The remaining configuration is almost the same as that of the first embodiment. In the first embodiment (FIGS. 9A to 9C and 10A to 10C), the line pair scanning and the shifted line pair scanning are used as the first method of forming a high-definition image. In this embodiment (FIGS. 13A to 13C and 14A to 14C), however, line pair scanning and interlacing scanning are used as a second method of forming a high-definition image. As in the first embodiment, one frame image is configured to include at least first and second field images.

FIG. 13A is a timing chart illustrating control signals supplied when the control device 30 performs the interlacing scanning in the first panel 201 serving as a reference panel and displays the second field images. FIG. 13B is a diagram illustrating types of signals supplied to the pixel circuits 48 connected to the scanning lines 462 when the first field images are displayed on the first panel 201. FIG. 13C is a diagram for describing types of signals supplied to the pixel circuits 48 connected to the scanning lines 462 when the second field images are displayed on the first panel 201. The first field images are formed using the line pair scanning and the second field images are formed using the interlacing scanning.

In this embodiment, a display method will be described giving an example in which odd images are displayed in the first fields and half of the odd images are rewritten to even images in the second fields. As will be described with reference to FIG. 13C, the interlacing scanning refers to a display method of selecting the scanning lines 462 for every other line at the time of formation of the field images and rewriting the image signals in the pixel circuits 48 connected to the selected scanning lines 462. In FIG. 13C, odd scanning lines 462 are not selected and the image signals are supplied to the pixel circuits 48 connected to even scanning lines 462.

First, to display odd images in the first fields, as illustrated in FIG. 13B, the same line pair scanning as that of FIG. 7B is performed. Since not only the position of the first image region 411 but also the combination of the simultaneously selected scanning lines 462 are the same as those of FIG. 7B, the control signals supplied to the scanning line driving circuit of the first panel 201 in the first fields are the same as those of FIG. 7A.

In the second fields, half of the odd images are rewritten to even images using the interlacing scanning That is, as illustrated in FIG. 13C, in the interlacing scanning in the second fields, the pixel circuits 48 connected to one scanning line 462 of the scanning lines 462 paired in the line pair scanning in the first fields are rewritten. For example, as illustrated in FIG. 13B, in the first field, the first-row image signal V1$j$ of the frame image is supplied to the pixel circuits 48 connected to the fifth scanning line G5 and the sixth scanning line G6, and the third-row image signal V3$j$ of the frame image is supplied to the pixel circuits 48 connected to the seventh scanning line G7 and the eighth scanning line G8. Subsequently, likewise, the 1079th-row image signal V1079$j$ of the frame image is supplied to the pixel circuits 48 connected to the 1083rd scanning line G1083 and the 1084th scanning line G1084. Next, as illustrated in FIG. 13C, in the second field, the second-row image signal V2$j$ of the frame image is supplied to the pixel circuits 48 connected to the sixth scanning line G6, and the fourth-row image signal V4$j$ of the frame image is supplied to the pixel circuits 48 connected to the eighth scanning line G8. Subsequently, likewise, the 1080th-row image signal V1080$j$ of the frame image is supplied to the pixel circuits 48 connected to the 1084th scanning line G1084. At this time, since the odd scanning lines 462 are not selected in the second field, the image signals supplied to the first field are maintained in the pixel circuits 48 connected to the odd scanning lines 462.

As described above, the first scanning line driving circuit includes a circuit that performs the line pair scanning to select two scanning lines 462 for every two lines from the $m_1$ scanning lines 462 and performs the interlacing scanning to select one scanning line 462 for every two lines from the $m_1$ scanning lines 462. Likewise, the second scanning line driving circuit includes a circuit that performs the line pair scanning to select two scanning lines 462 for every two lines from the $m_2$ scanning lines 462 and performs the interlacing scanning to select one scanning line 462 for every two lines from the $m_2$ scanning lines 462. Further, the third scanning line driving circuit includes a circuit that performs the line pair scanning to select two scanning lines 462 for every two lines from the $m_3$ scanning lines 462 and performs the interlacing scanning to select one scanning line 462 for every two lines from the $m_3$ scanning lines 462. Theses scanning line driving circuits have the same configuration as that of FIG. 4 according to the first embodiment so that the control signals supplied by the control device 30 can be changed.

FIG. 13A illustrates the control signals used for the scanning line driving circuits to perform the interlacing scanning. When the electro-optic devices 20 perform the interlacing scanning, the above-described even images (or the odd images) can be displayed at intervals of one scanning line, and thus the control device 30 can generate these control signals configured to enable the scanning. As illustrated in FIG. 13A, two-system control pulses adjacent to each other have a mutually overlapping section among the m-system control pulses R1, R2, . . . , and Rm. During a period in which 2-system control pulses R adjacent to each other overlap with each other, one enable signal ENBY supplied to the second AND circuits 130 corresponding to these control pulses R is set to an active level. For example, during a period in which the control pulses R1 and R2 overlap with each other, the enable 2 signal ENBY2 is set to the active level and the second scanning line G2 is selected. Likewise, during a period in which the control pulses R3 and R4 overlap with each other, the enable 4 signal ENBY4 is set to the active level and the fourth scanning line G4 is selected. That is, the enable 1 signal ENBY1 and the enable 3 signal ENBY3 are set to the inactive state and the enable 2 signal ENBY2 and the enable 4 signal ENBY4 are set to the active state alternately for every one period of the clock signal CLY. In this way, the scanning signals supplied to the scanning lines 462 are set to the active level for every other line, and thus the interlacing scanning is realized.

When the second image region 412 is misaligned relative to the first image region 411, similarly to the above description, the control signals to be supplied to the second panel 202 are changed. Hereinafter, a display method will be described giving an example in which the second image region 412 is misaligned by the degree equal to or less than one scanning line relative to the first image region 411.

FIG. 14A is a timing chart illustrating control signals supplied when the control device 30 performs the interlacing scanning on the second panel 202 and displays the second field image. FIG. 14B is a diagram for describing types of signals supplied to the pixel circuits 48 connected to the scanning lines 462 when the first field image is displayed on the second panel 202. FIG. 14C is a diagram for describing types of signals supplied to the pixel circuits 48 connected to the scanning lines 462 when the second field image is displayed on the second panel 202.

To display an odd image in the first field on the second panel 202, as illustrated in FIG. 14B, the same line pair scanning as that of FIG. 8B is performed. Since not only the position of the first image region 411 but also the combination of the simultaneously selected scanning lines 462 are the same as those of FIG. 8A, the control signals supplied to the scanning line driving circuit of the second panel 202 in the first field are the same as those of FIG. 8A.

In the second field, about the half of the odd images are rewritten to the even images on the second panel 202. As illustrated in FIG. 14C, the image signals are shifted by one scanning line in the interlacing scanning in the second panel 202 than in the interlacing scanning in the first panel 201 illustrated in FIG. 13C. This is realized by changing the control signals to enable signals. The control device 30 can generate these control signals configured to enable the scanning. As illustrated in FIG. 14A, two-system control pulses adjacent to each other have a mutually overlapping section among the m-system control pulses R1, R2, . . . , and Rm. During a period in which 2-system control pulses R adjacent to each other overlap with each other, one enable signal ENBY supplied to the second AND circuits 130 corresponding to these control pulses R is set to an active level. For example, during a period in which the control pulses R1 and R2 overlap with each other, the enable 1 signal ENBY1 is set to the active level and the first scanning line G1 is selected. Likewise, during a period in which the control pulses R3 and R4 overlap with each other, the enable 3 signal ENBY3 is set to the active level and the third scanning line G3 is selected. That is, the enable 2 signal ENBY2 and the enable 4 signal ENBY4 are set to the inactive state and the enable 1 signal ENBY1 and the enable 3 signal ENBY3 are set to the active state alternately for every one period of the clock signal CLY. In this way, the scanning signals supplied to the scanning lines 462 are set to the active level for every other line so as to be shifted by one scanning line relative to the first panel 201, and thus the interlacing scanning is realized.

The second field image is an even image when the first field image is an odd image. The second field image is an odd image when the first field image is an even image. Accordingly, on the contrary to the above-described example, an even image may be displayed in the first field and an odd image may be rewritten in the second field.

Thus, when the line pair scanning is used to form the first field image and the interlacing scanning is used to form the second field image, a high-definition image can be displayed at a high speed. According to this method, even when the line pair scanning and the interlacing scanning are performed by the first and second electric-optic devices, the position of an image formed by the first electro-optic device and the position of an image performed by the second electro-optic device can be changed in units of one scanning line. In other words, even when a high-definition image is displayed at a high speed using the line pair scanning or the interlacing scanning, the position of a display image can be minutely adjusted, and thus a high-quality image can be displayed.

Display 2 of Three-Dimensional Image

FIG. 15 is a diagram illustrating a method of displaying a three-dimensional image using the electronic apparatus according to this embodiment. Next, display of a three-dimensional image using the display of the high-definition image described above will be described with reference to FIG. 15.

The display of a high-definition image described above can be applied to display of a three-dimensional image. To display a three-dimensional image, as illustrated in FIG. 15, right-eye frame images GR and left-eye frame images GL are displayed alternately two by two. That is, to display a stereoscopic image, the display control circuit 32 of the control device 30 controls the electro-optic devices 20 such that the right-eye frame images GR and the left-eye frame images GL to which parallax is mutually assigned are displayed in a time division manner. A period in which two frame images are displayed is referred to as a unit period U. A period in which the right-eye frame images GR are displayed twice is a right unit period UR. A period in which the left-eye frames GL are displayed twice is a left unit period UL. The right unit period UR and the left unit period UL are alternately set. Two frame images include first, second, third, and fourth field images. The first field image is formed during a first field period 1-field, the second field image is formed during a second field period 2-field, the third field image is formed during a third field period 3-field, and the fourth field image is formed during a fourth field period 4-field. The first and third field images are the same odd image and the same even image is written as the second and fourth field images. During the first field period 1-field and the third field period 3-field of the right unit period UR, odd images GRO of the right-eye frame images GR are formed. During the second field period 2-field and the fourth field period 4-field of the right unit period UR, even images GRE of the right-eye frame images GR are formed. Likewise, during the first field period 1-field and the third field period 3-field of the left unit period UL, odd images GLO of the left-eye frame images GL are formed. During the second field period 2-field and the fourth field period 4-field of the left unit period UL, even images GLE of the left-eye frame images GL are formed. During the first field period 1-field of the right unit period UR, the left-eye frame image GL displayed during the fourth field period 4-field of the immediately previous left unit period UL is rewritten to the right-eye frame image GR. During the first field period 1-field of the left unit period UL, the right-eye frame image GR displayed during the fourth field period 4-field of the immediately previous right unit period UR is rewritten to the left-eye frame image GL.

The display control circuit 32 selects a writing mode during each field period and appropriately controls the driving circuit 44. The writing mode includes line pair scanning LP and interlacing scanning Skp. The first and third field images are formed through the ling pair scanning LP. The second and fourth field images are formed through the interlacing scanning Skp.

The control device 30 opens the right-eye shutter from the second field period 2-field to the fourth field period 4-field of the right unit period UR and closes the right-eye shutter during the other periods through the glasses control circuit 31. Likewise, the control device 30 opens the left-eye shutter from the second field period 2-field to the fourth field period 4-field of the left unit period UL and closes the left-eye shutter during the other periods through the glasses control circuit 31. Thus, the right-eye shutter is opened during a period of $\frac{3}{8}$ of the right unit period UR and the left-eye shutter can be opened during a period of $\frac{3}{8}$ of the left unit period UL. Accordingly, bright display can be realized in three-dimensional display and the electric alignment can be adjusted in units of one scanning line. Further, the first projected image region 1411 and the second projected image region 1412 are nearly matched. Therefore, the misalignment of the projected image 1430 in which the first image 431 and the second image 432 overlap each other is minimized.

On the contrary to the above description, the first and third field images may be set to even images and the second and fourth field images may be set to odd images.

The invention is not limited to the above-described embodiments, but various modifications, improvements, or the like of the above-described embodiments may be made.

This application claims priority to Japan Patent Application No. 2012-229587 filed Oct. 17, 2012, the entire disclosures of which are hereby incorporated by reference in their entireties.

What is claimed is:

1. An electronic apparatus comprising:
a first electro-optic device that includes a first display region;
a second electro-optic device that includes a second display region;
a control device that controls a display position of a first image displayed in the first display region and a display position of a second image displayed in the second display region; and
a combining device that combines the first and second images,
wherein the first electro-optic device includes
$m_1$ scanning lines (where $m_1$ is an integer equal to or greater than 3) that are disposed in the first display region, and
a first scanning line driving circuit that performs a scanning to sequentially select the $m_1$ scanning lines k by k (where k is an integer equal to or greater than 2),
wherein the second electro-optic device includes
$m_2$ scanning lines (where $m_2$ is an integer equal to or greater than 3) that are disposed in the second display region, and
a second scanning line driving circuit that performs the scanning to sequentially select the $m_2$ scanning lines k by k,
wherein the control device includes
a supply unit that supplies a first start pulse signal, a first clock signal used to shift the first start pulse signal, and a first enable signal logically combined with a signal shifted using the first clock signal to the first scanning line driving circuit and supplies a second start pulse signal, a second clock signal used to shift the second start pulse signal, and a second enable signal logically combined with a signal shifted using the second clock signal to the second scanning line driving circuit, and
a control unit that shifts a phase of the second start pulse signal by half of one horizontal scanning period of the scanning, shifts a phase of the second clock signal by the half of the horizontal scanning period of the scanning, and shifts a phase of the second enable signal by one horizontal scanning period of a line group scanning, when the display position of the second image is shifted by one scanning line.

2. The electronic apparatus according to claim 1,
wherein the control device further includes a storage circuit that stores at least a set value, and
wherein the control unit controls the phase according to the set value.

3. The electronic apparatus according to claim 2,
wherein the first start pulse signal, the first clock signal, the first enable signal, the second start pulse signal, the second clock signal, and the second enable signal have a plurality of output patterns, and
wherein the control device supplies a control signal with an optimum output pattern from the plurality of output patterns according to the set value.

4. A control device used in an electronic apparatus including a first electro-optic device that includes a first display region, a second electro-optic device that includes a second display region, and a combining device that combines a first image displayed in the first display region and a second image displayed in the second display region,
wherein the first electro-optic device includes
$m_1$ scanning lines (where $m_1$ is an integer equal to or greater than 3) that are disposed in the first display region, and
a first scanning line driving circuit that performs a scanning to sequentially select the $m_1$ scanning lines k by k (where k is an integer equal to or greater than 2),
wherein the second electro-optic device includes
$m_2$ scanning lines (where $m_2$ is an integer equal to or greater than 3) that are disposed in the second display region, and
a second scanning line driving circuit that performs the scanning to sequentially select the $m_2$ scanning lines k by k,
wherein the control device controls a display position of the first image and a display position of the second image, and wherein the control device includes
- a supply unit that supplies a first start pulse signal, a first clock signal used to shift the first start pulse signal, and a first enable signal logically combined with a signal shifted using the first clock signal to the first scanning line driving circuit and supplies a second start pulse signal, a second clock signal used to shift the second start pulse signal, and a second enable signal logically combined with a signal shifted using the second clock signal to the second scanning line driving circuit, and
- a control unit that shifts a phase of the second start pulse signal by half of one horizontal scanning period of the scanning, shifts a phase of the second clock signal by the half of the horizontal scanning period of the scanning, and shifts a phase of the second enable signal by one horizontal scanning period of a line group scanning, when the display position of the second image is shifted by one scanning line.

5. A method of driving an electronic apparatus including a first electro-optic device that includes a first display region, a second electro-optic device that includes a second display region, a control device that controls a display position of a first image displayed in the first display region and a display position of a second image displayed in the second display region, and a combining device that combines the first and second images, wherein the first electro-optic device includes
- $m_1$ scanning lines (where $m_1$ is an integer equal to or greater than 3) that are disposed in the first display region, and
- a first scanning line driving circuit that performs a scanning to sequentially select the $m_1$ scanning lines k by k (where k is an integer equal to or greater than 2), wherein the second electro-optic device includes
- $m_2$ scanning lines (where $m_2$ is an integer equal to or greater than 3) that are disposed in the second display region, and
- a second scanning line driving circuit that performs the scanning to sequentially select the $m_2$ scanning lines k by k, and wherein the method comprises:
supplying a first start pulse signal, a first clock signal used to shift the first start pulse signal, and a first enable signal logically combined with a signal shifted using the first clock signal to the first scanning line driving circuit;
supplying a second start pulse signal, a second clock signal used to shift the second start pulse signal, and a second enable signal logically combined with a signal shifted using the second clock signal to the second scanning line driving circuit; and
shifting a phase of the second start pulse signal by half of one horizontal scanning period of the scanning, shifting a phase of the second clock signal by the half of the horizontal scanning period of the scanning, and shifting a phase of the second enable signal by one horizontal scanning period of a line group scanning, when the display position of the second image is shifted by one scanning line.

6. An electro-optic device driving method comprising:
supplying control signals to first and second electro-optic devices,
wherein the first and second electro-optic devices form one frame image using first and second field images,
wherein the first electro-optic device includes a first display region including $m_1$ scanning lines (where $m_1$ is an integer equal to or greater than 3) and a first scanning line driving circuit,
wherein the first scanning line driving circuit includes a circuit that performs line pair scanning to select two scanning lines for every two lines from the $m_1$ scanning lines,
wherein the second electro-optic device includes a second display region including $m_2$ scanning lines (where $m_2$ is an integer equal to or greater than 3) and a second scanning line driving circuit,
wherein the second scanning line driving circuit includes a circuit that performs the line pair scanning to select two scanning lines for every two lines from the $m_2$ scanning lines,
wherein the control signals include a first start pulse signal supplied to the first scanning line driving circuit, a first clock signal supplied to the first scanning line driving circuit, a first enable signal supplied to the first scanning line driving circuit, a second start pulse signal supplied to the second scanning line driving circuit, a second clock signal supplied to the second scanning line driving circuit, and a second enable signal supplied to the second scanning line driving circuit,
wherein the first and second start pulse signals are temporally shifted only by an integer multiple of half of a horizontal scanning period of the line pair scanning,
wherein the first and second clock signals are different from each other in phase at the same period,
wherein the first and second enable signals are different from each other,
wherein the first and second field images are formed using the line pair scanning,
wherein the first field image is an image (odd image) formed using an image signal of an odd row of the frame image or an image (even image) formed using an image signal of an even row of the frame image,
wherein the second field image is the even image when the first field image is the odd image, and is the odd image when the first field image is the even image, and
wherein one scanning line is shifted between the line pair scanning at the time of the formation of the first field image and the line pair scanning at the time of the formation of the second field image.

7. An electro-optic device driving method comprising:
supplying control signals to first and second electro-optic devices,
wherein the first and second electro-optic devices form one frame image using first and second field images,
wherein the first electro-optic device includes a first display region including $m_1$ scanning lines (where $m_1$ is an integer equal to or greater than 3) and a first scanning line driving circuit,
wherein the first scanning line driving circuit includes a circuit that performs line pair scanning to select two scanning lines for every two lines from the $m_1$ scanning lines and performs interlacing scanning to select one scanning line for every two lines from the $m_1$ scanning lines,
wherein the second electro-optic device includes a second display region including $m_2$ scanning lines (where $m_2$ is an integer equal to or greater than 3) and a second scanning line driving circuit,
wherein the second scanning line driving circuit includes a circuit that performs the line pair scanning to select two scanning lines for every two lines from the $m_2$ scanning lines and performs the interlacing scanning to select one scanning line for every two lines from the $m_2$ scanning lines, wherein the control signals include a first start pulse signal supplied to the first scanning line driving circuit, a first clock signal supplied to the first scanning line driving circuit, a first enable signal supplied to the first scanning line driving circuit, a second start pulse signal supplied to the second scanning line driving circuit, a second clock signal supplied to the second scanning line driving circuit, and a second enable signal supplied to the second scanning line driving circuit, wherein at the time of the line pair scanning, the first and second start pulse signals are temporarily shifted only by an integer multiple of half of a horizontal scanning period of the line pair scanning, wherein at the time of the line pair scanning, the first and second clock signals are different from each other in phase at the same period, wherein at the time of the line pair scanning, the first and second enable signals are different from each other, wherein the first field image is formed using the line pair scanning and the second field image is formed using the interlacing scanning, wherein the first field image is an image (odd image) formed using an image signal of an odd row of the frame image or an image (even image) formed using an image signal of an even row of the frame image, wherein the second field image is the even image when the first field image is the odd image, and the second image is the odd image when the first field image is the even image.

\* \* \* \* \*